United States Patent
Homma et al.

(10) Patent No.: US 8,317,896 B2
(45) Date of Patent: Nov. 27, 2012

(54) METHOD OF RECYCLING USEFUL METAL

(75) Inventors: Tetsuya Homma, Tokyo (JP);
Tomoyuki Ubusawa, Tokyo (JP);
Tomoyuki Furuyama, Tokyo (JP);
Akihiro Morikaku, Tokyo (JP);
Kumpei Tanaka, Tokyo (JP)

(73) Assignee: Shibaura Institute of Technology, Tokyo (JP)

( * ) Notice: Subject to any disclaimer, the term of this patent is extended or adjusted under 35 U.S.C. 154(b) by 61 days.

(21) Appl. No.: 12/812,154

(22) PCT Filed: Dec. 25, 2008

(86) PCT No.: PCT/JP2008/073572
§ 371 (c)(1),
(2), (4) Date: Sep. 30, 2010

(87) PCT Pub. No.: WO2009/087908
PCT Pub. Date: Jul. 16, 2009

(65) Prior Publication Data
US 2011/0017020 A1    Jan. 27, 2011

(30) Foreign Application Priority Data
Jan. 10, 2008    (JP) .................................. 2008-003661

(51) Int. Cl.
*C22B 7/00* (2006.01)
*B22F 9/04* (2006.01)

(52) U.S. Cl. .......................................... 75/403; 75/353

(58) Field of Classification Search ..................... 75/403
See application file for complete search history.

(56) References Cited

U.S. PATENT DOCUMENTS
2005/0028556 A1* 2/2005 Akai et al. ..................... 65/21.2

FOREIGN PATENT DOCUMENTS
| JP | 07-508927 A | 10/1995 |
| JP | 09-005514 | 1/1997 |
| JP | 09-157767 | 6/1997 |
| JP | 11-192475 A | 7/1999 |
| JP | 2000-017464 A | 1/2000 |

(Continued)

OTHER PUBLICATIONS

Machine translation of Doi et al. JP 2007-270311, published Oct. 2007.*

(Continued)

*Primary Examiner* — George Wyszomierski
*Assistant Examiner* — Tina M McGuthry Banks
(74) *Attorney, Agent, or Firm* — Pearne & Gordon LLP

(57) ABSTRACT

A method of recycling useful metals is provided. The method enables useful metals including indium, zinc, yttrium, europium, lanthanum, terbium, gadolinium, antimony, lead, copper, tin, and silver to be recovered from wastes, such as wasted flat panel displays, and recycled economically with small energy consumption. The method of recycling useful metals includes: a step in which wastes comprising various flat panel displays, e.g., liquid-crystal display panels, are crushed/powdered; a step in which the resultant particles are dissolved in an aqueous hydrofluoric acid solution; and a step in which various metal oxides and various metal fluorides which remain undissolved are filtered off and the aqueous hydrofluoric acid solution containing various metal ions is electrolyzed to deposit and recover metals for transparent-electrode oxides, such as indium and zinc, and other useful metals.

21 Claims, 27 Drawing Sheets

| FOREIGN PATENT DOCUMENTS | | | |
|---|---|---|---|
| JP | 2000-203841 A | | 7/2000 |
| JP | 2000-335915 A | | 12/2000 |
| JP | 2000-348698 A | | 12/2000 |
| JP | 2001-274116 A | | 10/2001 |
| JP | 2001-296508 A | | 10/2001 |
| JP | 2001-305501 A | | 10/2001 |
| JP | 2001-305502 A | | 10/2001 |
| JP | 2001-337305 A | | 12/2001 |
| JP | 2003045336 A | * | 2/2003 |
| JP | 2003-293048 A | | 10/2003 |
| JP | 2004-323931 A | | 11/2004 |
| JP | 2005-334838 A | | 12/2005 |
| JP | 2007-270311 A | | 10/2007 |
| JP | 2007270311 A | * | 10/2007 |
| JP | 2008-103217 A | | 5/2008 |

OTHER PUBLICATIONS

International Search Report for PCT/JP2008/073572 dated Feb. 17, 2009.

Hidemitsu Sasaki et al "Evaluation of capability for metal removal from waste silicate glass (2)" Collection of Drafts for Speech of the 52nd Meeting of the Japan Society of Applied Physics and Related Societies; lecture No. 30a-YA-2; p. 498; Mar. 30, 2005.

M. Nara et al "Evaluation of capability for metal removal from waste silicate glass" Collection of Drafts for Speech of the 65th Academic Lecture of the Japan Society of Applied Physics; lecture No. 3p-E-8; p. 354; Sep. 3, 2004.

* cited by examiner

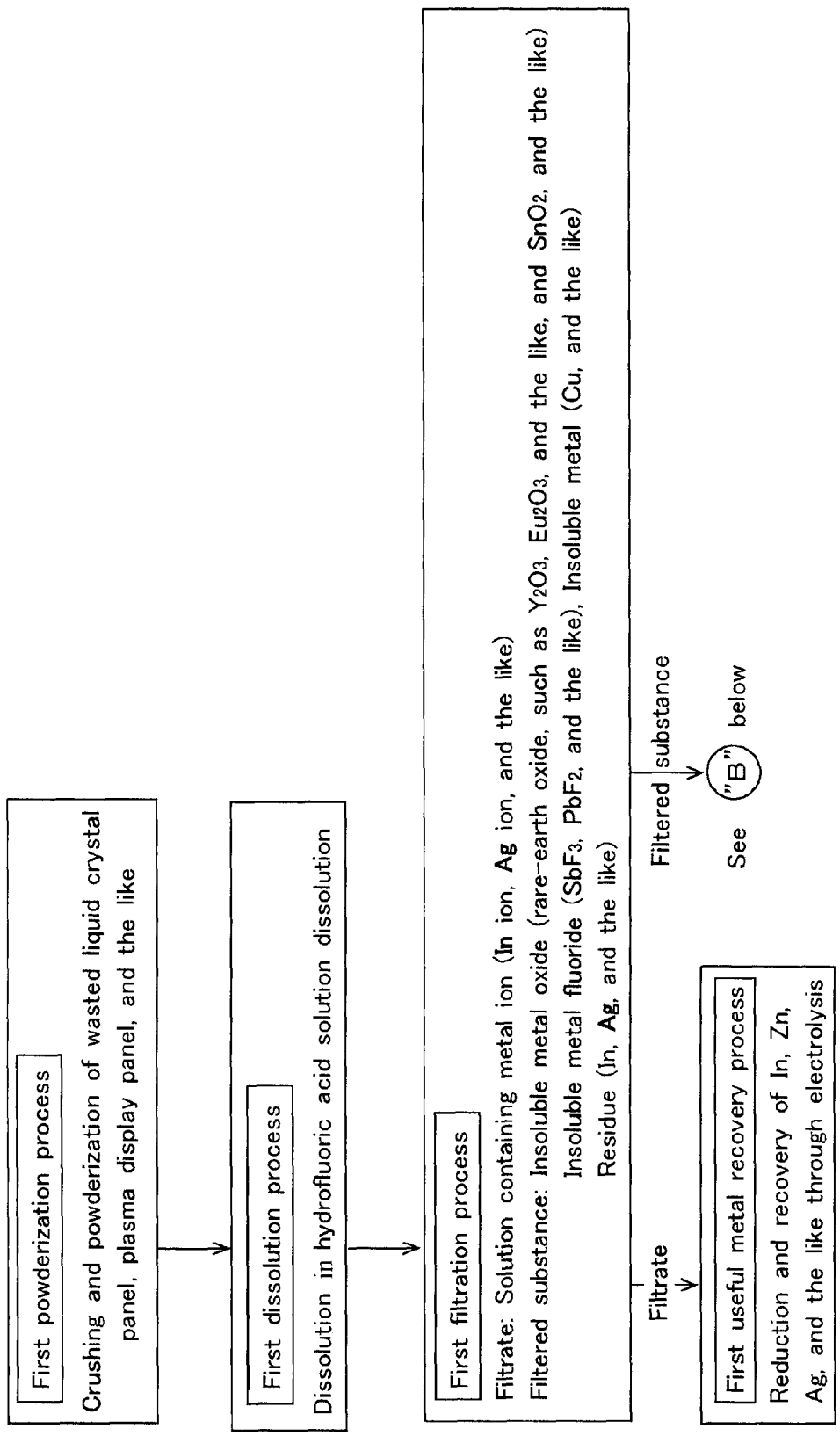

METHOD OF RECYCLING USEFUL METAL

This application is a National Stage Entry of PCT/JP2008/073572 under 35 U.S.C. §371, which is incorporated by reference in its entirety.

BACKGROUND OF THE INVENTION

1. Field of the Invention

The present invention relates to a method of recycling useful metals from waste such as wasted flat panel displays, wasted cathode ray tubes, wasted fluorescent tubes, wasted integrated circuits, and wasted printed circuit boards.

2. Description of the Related Art

Recently, regarding display devices for images, etc., a change from the use of cathode ray tubes to liquid crystal display panels or plasma display panels has taken place. Additionally, manufacturing of cathode ray tubes within Japan is not being implemented. Thus, the quantity of wasted cathode ray tubes has increased. Moreover, as far as fluorescent tubes are concerned, it can be presumed that the quantity of wasted fluorescent tubes would increase due to renovations for energy conservation of lightning equipment, changes to apply the same to light-emitting diodes for the future, and the like. In addition, the quantity of integrated circuits and circuit boards used for electronic equipment is increasing. Highly valuable rare earth metals are used for such waste. Such metals include transparent electrodes (ITO: Indium Tin Oxide) comprising a compound of indium oxide ($In_2O_3$) and tin oxide ($SnO_2$). Furthermore, many oxides of rare earth metals are used for fluorescent materials in which energy in forms such as ultraviolet light or electron beams is converted into visible light.

Furthermore, cathode ray tubes and fluorescent tubes contain lead (Pb) and antimony (Sb). A large quantity of silver (Ag) is used for electromagnetic shielding meshes for plasma display panels. Also, conventional solders contain lead (Pb) and zinc (Zn). Recent solders that do not contain lead (lead-free solders) contain silver (Ag), tin (Sn), copper (Cu), and the like.

In recent years, it has been difficult to obtain useful metals, including the aforementioned rare earth metals due to speculation and export restrictions of resource producing nations. The necessity for governmental stockpiles has further increased. Therefore, the importance of recycling and recovery of such rare earth metals is growing. Moreover, the demand for metals in developing countries including China has increased. Due to such increase, prices of useful metals, such as silver and copper, are skyrocketing. In particular, accompanying the increase in demand for flat panel displays, an increase in demand for indium (In) is inevitable. Results of computations suggest that even if recoverable reserves are estimated at 6,000 tons at most, indium will disappear by 2019. Research and development for alternative ITO materials, such as zinc oxide, are in progress. However, it is urgently necessary to prolong In resources through recycling. A review of the use of zinc (Zn) in the form of zinc oxide (ZnO) as a constituent of transparent electrode material is also underway. Furthermore, lead (Pb) is used for electrodes of lead acid batteries (secondary batteries) in many cases. Antimony (Sb) is used for aluminum alloy additives, bearing alloys, additives for semiconductors, and the like in many cases.

Recycling of conventional rare earth metals, such as indium, yttrium, europium, lanthanum, terbium, gadolinium, and the like, as well as useful metals, such as lead, antimony, zinc, silver, copper, and the like, is described as follows with reference to the prior patent documents.

(Patent document 1: Kokai (Jpn. Unexamined Patent Publication) No. 2005-334838).

The invention described in patent document 1 mentioned above relates to a recycling system for valuable metals used to collect and recycle indium (In) and silver (Ag) as valuable metals that can be found on panel surfaces as electrode materials from waste of flat panel displays such as liquid crystal display panels, plasma display panels, or the like.

According to patent document 1, as shown in FIG. 1, crushed or scrapped wasted flat panel displays are immersed in HCl solutions. Through filtering such solution, solution containing In and residues containing Ag are separated, and In is extracted. In-containing solution is condensed and is prepared so that prescribed In concentration will take place. Substrates are spray coated with such solution. As a result, clear thin films are formed on the substrates. Additionally, In can be collected by electrolyzing the extracted In-containing solution.

In relation to recovery of Ag, residues containing Ag are immersed in an $HNO_3$ or heated $H_2SO_4$ solution. Through electrolyzing and filtering the resultants, a solution containing Ag can be obtained. KCl or NaCl is added to an Ag-containing solution, and AgCl is collected in the form of a solution. Such AgCl solution is heated, and the resulting Ag is collected. Additionally, residues containing Ag are immersed in an $HNO_3$ or heated $H_2SO_4$ solution. An Ag-containing solution formed through dissolution and filtering is electrolyzed, and Ag can be collected. Furthermore, Ag-containing residues are immersed in an $Na_2S_2O_3$ solution. An Ag-containing solution formed through dissolution and filtering is electrolyzed and left to stand, and thereafter $Ag_2S$ can be collected.

According to patent document 1, crushed or scrapped wasted flat panel displays are further immersed in an $HNO_3$ solution. Through filtering such solution, a solution containing In and Ag is obtained, residues are separated, and In and Ag are extracted. KCl or NaCl is added and In-containing solutions can be obtained. At the same time, resulting AgCl sediment can be collected. The extracted In-containing solution is condensed and is prepared so that a prescribed In concentration will be attained and substrates are spray coated with such solution. As a result, clear thin films are formed on the substrates. Additionally, In can be collected by electrolyzing the extracted In-containing solution. The collected AgCl solution is thermally treated and is collected in the form of Ag.

(Patent document 2: Kokai (Jpn. Unexamined Patent Publication) No. 2001-296508)

The invention described in the aforementioned patent document 2 relates to a simplified, highly powerful, and economical processing method for wasted liquid crystal display panels, which enables ideal recycling that hardly generates any waste.

According to patent document 2, using fluorescent X-rays, glass substrates for liquid crystal display panels are sorted based on glass type. Organic material contained in liquid crystal display panels is heated and removed. Films formed on the aforementioned glass substrates are mechanically removed and collected in the form of metal powder. Additionally, as a process preceding the process of film removal, glass substrates are crushed and glass chips are recycled as glass materials.

(Patent document 3: Kokai (Jpn. Unexamined Patent Publication) No. 2001-305502)

The invention described in the aforementioned patent document 3 relates to an economical processing method for wasted liquid crystal display panels, which enables ideal recycling that hardly generates any waste.

According to patent document 3, liquid crystal display panels are cut under a state in which polarizing film is present, and liquid crystals are collected. Additionally, following peeling off the polarizing film from the liquid crystal display panels, the corresponding liquid crystal display panels are cut and liquid crystal solution is collected. At this time, glass substrates of liquid crystal display panels are cut without chopping the seal materials encapsulating liquid crystals. A method for dissolution and recovery of liquid crystals using solvents and a method for recovery of liquid crystals by scraping and removing of the same are disclosed.

Recovery of films formed on cut glass substrates is conducted using a method for mechanical detachment and a method for immersing cut glass substrates in concentrated sulfuric acid.

Furthermore, in regards to sorting out types of glass, fluorescent X-rays are used. The sorted glass substrates are then crushed.
(Patent document 4: Kokai (Jpn. Unexamined Patent Publication) No. 2001-305501)

The invention described in the aforementioned patent document 4 relates to an economical processing method for wasted liquid crystal display panels that enable ideal recycling that hardly generates any waste.

According to patent document 4, polarizing film is stripped from liquid crystal display panels and glass substrates of liquid crystal display panels are cut off. Following this process, liquid crystal solution is collected. The cut glass substrates are sorted based on glass type. Thin films formed on the aforementioned glass substrates are mechanically removed and collected. The glass substrates of liquid crystal display panels are cut off without chopping seal materials encapsulating liquid crystals during the process of cutting the panels. Furthermore, following removal of the polarizing film, a method for performing a process for cutting panels is also disclosed. A method of using solvents and a method of scraping of liquid crystals are applied for the recovery of liquid crystals. Fluorescent X-rays are used for determining glass type. As a process preceding the process for thin film removal, a method for crushing the sorted glass substrates based on glass type is used. Thin films on the glass substrates are mechanically removed and collected, and metals such as indium and chromium are collected from the thin films.
(Patent document 5: Kokai (Jpn. Unexamined Patent Publication) No. 2001-337305)

The invention described in the aforementioned patent document 5 relates to an economical processing method for wasted liquid crystal display panels involving the collection and recycling of glass substrates, liquid crystals, and the like, which enables an ideal form of recycling that hardly generates any waste.

According to patent document 5, polarizing film is peeled off from liquid crystal display panels, and glass substrates of liquid crystal display panels are cut off. Following this process, the cut glass substrates are chamfered. The cut glass substrates are sorted based on glass type. Thin films formed on the aforementioned cut glass substrates are removed and collected. Additionally, following performance of polarizing film detachment, a method for conducting a panel cutting process is also disclosed. Furthermore, in the process of cutting panels, a method for cutting the glass substrates without chopping the seal materials encapsulating liquid crystals is also used. Fluorescent X-rays are used for sorting types of glass. In order to remove thin films, a method for etching and/or polishing thin films, and removing organic compound contained in the cut glass substrates is also disclosed. For the purpose of eliminating remaining organic compound, a method for immersing glass substrates in concentrated sulfuric acid or strong alkaline solutions is disclosed. In regards to recovery of liquid crystals, a method for recovery of liquid crystals following the cutting of panels is also disclosed. A method for dissolving liquid crystals using solvents and a method for the scraping of liquid crystals are disclosed. Furthermore, metals such as indium and chromium are collected from the thin films.
(Patent document 6: Kokai (Jpn. Unexamined Patent Publication) No. 2008-103217)

The invention described in the aforementioned patent document 6 relates to environmentally desirable low-cost plasma display panels in which transparent electrodes are formed using ITO alternative materials.

In regards to the invention described in the aforementioned patent document 6, it is disclosed that transparent electrodes, which comprise display electrodes for plasma display panels, are formed using materials mainly based on zinc oxides, and that zinc oxides are used for one of the components of dielectric layers formed to cover the transparent electrodes.
(Patent document 7: Kokai (unexamined patent publication) No. 1997-5514)

The invention described in the aforementioned patent document 7 relates to a color filter for liquid crystal displays in which cracking and peeling are less likely to take place in regards to transparent electrodes for a liquid crystal drive.

In regards to the invention described in the aforementioned patent document 7, it is disclosed that such invention comprises amorphous oxides containing zinc and indium as the main cation elements for transparent electrodes for liquid crystal drives of liquid crystal displays, and that the atomic ratio of the zinc element and indium element, or $Zn/(Zn+In)$, is ensured to be 0.1 or more and 0.2 or less.
(Patent document 8: Kokai (unexamined patent publication) No. 2000-335915)

The invention described in the aforementioned patent document 8 relates to a method for low-cost recovery of glass materials that do not contain impurities such as metals or metal oxides based on low consumption energies and a system thereof.

The invention described in the aforementioned patent document 8 was invented by one of the inventors of the present invention. Wasted glass materials with silicon oxide as a major component that contain metals and/or metal oxides as impurities are dissolved in a hydrofluoric acid aqueous, a hydrofluosilicic acid solution not in a saturated state, or a solution containing fluorine ions that is a mixture of the aforementioned solutions or the like. After a saturated state and a supersaturated state are achieved, additives for supersaturation are added to a solution in which a glass material is dissolved, and oxide silicon is deposited. Additionally, a method for heat treatment of acquired silicon oxide in any one of the atmospheres selected from the group consisting of inert gas, reducing gas, water vapor, mixed gas of inert gas and reducing gas, and mixed gas of inert gas and water vapor is disclosed. Furthermore, a system for recovery of glass materials from wasted glass is disclosed.
(Patent document 9: Kokai (unexamined patent publication) No. 2001-274116)

The invention described in the aforementioned patent document 9 relates to a copper plating solution used to form high-purity copper thin films not requiring special reducing agents. Moreover, the invention relates to a method for forming a copper multilevelwiring structure using the aforementioned the copper plating solution.

The invention described in the aforementioned patent document 9 was invented by one of the inventors of the present invention. A copper plating solution include solution that allows copper ion sources, such as copper oxides and copper hydroxides, to be dissolved and formed in hydrofluoric acid and/or hydrofluosilicic acid. Using such a solution, a multilevel copper wiring structure is formed on semiconductor integrated circuit substrates or multilayer printed circuit boards. Such method is disclosed.
(Patent document 10: Kokai (unexamined patent publication) No. 2004-323931)

The invention described in the aforementioned patent document 10 relates to a copper plating solution that forms copper plating films directly on TaN barrier films, which does not require the formation of copper seed layers or a pretreatment solution for a method involving an electrolyte copper plating solution using acid copper sulfate baths. Additionally, the invention relates to a method for forming a multilevel copper wiring structure using the aforementioned copper plating solution and pretreatment solution.

One of the inventors of the present invention was also one of the inventors of the invention described in the aforementioned patent document 10. A copper plating solution and copper plating pretreatment solution comprise as main components hydrofluoric acids and/or hydrofluosilicic acids including copper ions. At least one member selected from the group consisting of titanium compounds or polyhydric alcohols is added as an additive. Additionally, via an electroless plating method and/or electrolytic plating method, copper plating films are formed directly without forming copper seed layers in advance on various substrates and on barrier metal films comprising TaN films and TiN films. Such method is disclosed. Moreover, a method for conducting electroless copper plating pretreatment and/or electrolytic copper plating pretreatment using an aforementioned copper plating pretreatment solution is disclosed.
(Patent document 11: Kokai (unexamined patent publication) No. 2000-17464)

The invention described in the aforementioned patent document 11 relates to a recycling method whereby, following recovery and regenerating reaction relating to a copper chloride etching waste solution that generates in etching tanks, such solution is again provided for use in plating process, which allows cost reduction for raw materials and reduction of problematic pollution for environmental protection, and an equipment for the same.

According to the aforementioned patent document 11, a copper chloride etching waste solution that generates in etching tanks are collected, copper hydroxide is generated in a sodium-hydroxide solution, and a solid copper oxide is formed based on a pyrolytic technique at a temperature of 80° C. or higher. Subsequently, following dehydration and drying of such solid copper oxide, the resultant is dissolved in sulfuric acid and an ion-containing electrolytic solution is formed. Such solution is transported to plating tanks, and electrodeposition takes place using titanium metal electrode. As such, a recycling method for etching waste solutions is disclosed.

Additionally, according to the aforementioned patent document 11, a recycling equipment for etching waste solution comprising a unit for recovery of copper chloride etching waste solution, a unit for supply of sodium hydroxide, a reaction unit for sodium hydroxide with copper chloride etching waste solution, a dehydrating unit, storage space for dried copper oxide, a dissociation unit, inflow of electrolytic solution and outflow of electroplating residue liquids, and an electroplating unit are disclosed.

(Patent document 12: Kokai (unexamined patent publication) No. 2003-293048)

The invention described in the aforementioned patent document 12 relates to a recycling method whereby great amounts of copper and nickel can be inexpensively recycled from resin plating waste materials through mixing copper plating films and nickel plating films without separating and removing copper components.

According to the aforementioned patent document 12, a method for recovery of metal components from resin plating waste materials is disclosed. Such method comprises a process for forming a metal component enriched mixture that enhances the percentage of existing plating film components of resin plating waste materials with copper plating films and nickel plating films formed on surfaces of resin substrates, and a process for recovering metal components that acquire alloys containing copper and nickel following heating and dissolution regarding the aforementioned mixture. In relation to the process for forming a metal component enriched mixture, a method for reducing the aforementioned resin substrate components, a method for increasing the aforementioned metal components, and a method for reducing the aforementioned resin substrate components and increasing the aforementioned metal components are provided. According to the aforementioned patent document 12, in regards to the method for recovery of metal components, alloys such as Cu—Ni alloys and Al—Cu—Ni—Cr alloys can be obtained.
(Patent document 13: Kokai (unexamined patent publication) No. 2000-348698)

The invention described in the aforementioned patent document 13 relates to a valve-regulated lead acid battery that allows the number of processing steps to be reduced at the assembly and is superior in terms of separation and recovery at the time of recycling, and a method of manufacturing the same.

In regards to the invention described in the aforementioned patent document 13, a method for manufacturing a valve-regulated lead acid battery with the application of a silane coupling agent solution to the surface of bolt casts and drying the same, inserting such bolt casts into resin materials and shaping the same, and fabricating a lid therefor is disclosed.
(Patent document 14: Kokai (unexamined patent publication) No. 1997-157767)

The invention described in the aforementioned patent document 14 relates to a method for lead separation that separates lead from specimens that include lead and makes it easier to dispose of and recycle the specimens.

In relation to the invention described in the aforementioned patent document 14, it is disclosed that lead from lead solder is separated using hydrochloric acid, acetic acid, and the like, solvents of methanol, ethanol, ethylene glycol, and the like, and lead-separating liquids prepared through dissolution of iodine. It is also disclosed that components are nondestructively separated and recovered via such method.

[Non-patent document 1] Ken Nara, Hidemitsu Sasaki, Daisuke Yamaguchi, Michiru Sugawara, Yu Nishimura, Tetsuya Homma, and Hideo Takahashi: "Evaluation of Metal Element Separation Performance from Wasted Silicate Glass Materials" Abstract for Speech of the 65$^{th}$ Academic Lecture of the Japan Society of Applied Physics, presentation number 3p-E-8, p. 354, Sep. 3, 2004

The aforementioned non-patent document 1 relates to a conference presentation involving one of the inventors of the present invention. Results based on research concerning the possibility of separation of metal elements through a cyclic voltammetry method are disclosed. Lead oxide (PbO) and iron oxide (III) ($Fe_2O_3$) are each dissolved in separate hydrofluoric acid (HF) aqueous solutions. Platinum (Pt) is used for electrolysis. Results based on research concerning current-voltage characteristics involving the use of a cyclic voltammetry method are disclosed. When wasted silicate glasses are dissolved in an HF solution and the resultant is prepared by hydrofluosilicic acids, there is a high possibility of being able to separate Pb and Fe in the forms of $PbF_2$ and $Fe_2O_3$, respectively. [Non-patent document 2] Hidemitsu Sasaki, Daisuke Yamaguchi, Yu Nishimura, Ken Nara, and Tetsuya Homma: "Evaluation of Metal Element Separation Performance from Wasted Silicate Glass Materials (2)" Abstract for Speech of the $52^{nd}$ Meeting of the Japan Society of Applied Physics and Related Societies, presentation number 30a-YA-2, p. 498, Mar. 30, 2005

The aforementioned non-patent document 2 relates to a conference presentation involving one of the inventors of the present invention. Fluorinated silicon oxide (SiOF) thin films are formed using a solution whereby glass powder with the same composition as CRT glass is dissolved in a hydrofluoric acid (HF) aqueous solution. Results of performance concerning characterization are disclosed. Silica ($SiO_2$), lead oxide (PbO), barium oxide (BaO), strontium oxide (SrO), and the like are prepared based on the same composition as CRT glass, and the resultants are dissolved in an HF solution resulting in. A hydrofluosilicic acid ($H_2SiF_6$) aqueous solution, and then, a supersaturated additive Al is added, and silicon substrates are immersed. SiOF thin films are then deposited.

SUMMARY OF THE INVENTION

Problems to be Solved by the Invention

In patent document 1, examples are limited to plasma display panels using silver. However, recycling of silver (Ag) through mixture with other display panels and lead-free solders used for printed circuit boards has not been disclosed. Additionally, HCl is used without aqua regia, which comprises as main components HCl and $HNO_3$ generally used for ITO dissolution and processing. It is problematic in that the dissolution speed of metal oxides, such as indium oxide ($In_2O_3$), in HCl is slow. Moreover, it is also problematic in that other metals used for wiring and the like are dissolved.

Furthermore, In patent documents 2 through 5, the recycling of glass substrates has been focused on. No method for separation and recovery of metals such as indium has been specifically disclosed.

Moreover, in patent documents 6 and 7, the intended use of zinc oxide has been disclosed. However, a method for recycling zinc has not been disclosed.

In patent document 8, a method for separating silica glass and metal oxides or metal fluorides and recycling the same has been disclosed. However, a method for recycling metals from metal oxides or metal fluorides has not been disclosed.

In patent document 9, copper oxides and copper hydroxides are dissolved in hydrofluoric acid and/or hydrofluosilicic acid. However, it is problematic in that metal copper is insoluble in the aforementioned solutions.

In patent document 10, in the same manner as the case of patent document 9, copper oxides and copper hydroxides are dissolved in the hydrofluoric acid and/or hydrofluosilicic acid. However, it is problematic in that metal copper is insoluble in the aforementioned solutions.

Patent document 11 relates to the recycling of a plating solution for chloride in copper plating and reuse for copper plating as mentioned above. This completely differs from the purpose and method of the invention of the present application.

According to patent document 12, alloys, such as Cu—Ni alloys, Al—Cu—Ni—Cr alloys, and the like can be obtained. However, it is problematic in that it is difficult to realize Cu elemental substance recovery.

The invention described in patent document 13 relates to a valve-regulated lead acid battery that is superior for separational recovery at the time of recycling and a method of manufacturing the same. The invention described in patent document 14 relates to a method for lead separation by which lead is separated from samples that include lead, such method making it easier to dispose of and recycle the samples. None of the aforementioned inventions has disclosed the recycling of the lead itself.

Non-patent documents 1 and 2 simply suggested the possibility of separation and collection of useful metal elements, and no specific details are completely disclosed.

As such, in addition to the conventional technical problems, the fact that simultaneous treatment of wastes cannot be conducted has been problematic. Such wastes include a plurality of types of wasted flat panel displays, wasted cathode ray tubes, wasted fluorescent tube glasses, wasted solar panels, wasted integrated circuits, wasted printed circuit boards, wasted harnesses for in-car copper wiring, power cables, electric wires for energy transmission and distribution, coaxial cables, twin-lead type feeders, and the like.

The purpose of the present invention is to solve the conventional technical problems mentioned above and to provide a method of recycling that allows economical and low-energy recovery and recycling of metals for transparent electrode oxides such as zinc and the like, rare-earth metals for fluorescent metal oxides such as yttrium, europium, terbium, gadolinium, and the like, and useful metals, such as lead, antimony, silver, tin, electrode lead, and the like, from a single type or a plurality of types of wastes of wasted flat panel displays, wasted cathode ray tubes, wasted fluorescent tubes, wasted integrated circuits, wasted printed circuit boards, harnesses for in-car copper wiring, power cables, electric wires for energy transmission and distribution, coaxial cables, twin-lead type feeders, and the like, simultaneously.

Advantageous Effect of the Invention

According to the method for recycling useful metals of the present invention, it is possible to simultaneously allow crushing and powderization of a single type or a plurality of types of wastes of wasted flat panel displays, wasted cathode ray tubes, wasted fluorescent tubes, wasted integrated circuits, wasted printed circuit boards, wasted solar panels, harnesses for in-car copper wiring, power cables, electric wires for energy transmission and distribution, coaxial cables, twin-lead type feeders, and the like, simultaneously and without separation thereof. At the same time, it becomes possible to dissolve the same in a solution consisting primarily of HF at room temperature. At such time, there are many organic substances such as plastics and the like and paper labels that are insoluble in an HF solution. The present invention offers the advantage of making separation thereof unnecessary. Additionally, it is possible to separate insoluble substances in an HF solution and to prepare soluble solutions classified according to metal species for the purpose of recycling at room temperature. Therefore, the method for recycling useful metals of the present invention enables low-energy economical recycling of useful metals.

Additionally, when Ag/AgCl is used as a reference electrode, the redox potentials for In, Sn, Zn, Eu, Tb, Gd, Sb, Pb, and Ag are −0.534V, −0.336V, −0.959V, −2.186V, −2.496V, −2.486V, 0.014V, −0.322V, and 0.603V, respectively. Each thereof is different. Thus, due to voltage control at the time of electrolysis, it is possible to separate and recover relevant metals classified according to metal species. Furthermore, precipitation takes place in the form of an alloy of the corresponding useful metals through electrolysis. Following this process, the resultant is dissolved in an acid solution, such as nitric acid, hydrochloric acid, and the like, again. Thereafter, through repeated electrolysis, it is possible to separate and recover the resultant classified according to metal species, and to achieve high purity thereof. Such effects can be expected. The redox potentials for both Y and La are −2.556V. Thus, it is difficult to separate Y and La at the same time using the potential difference at the time of electrolysis. However, as stated in the third embodiment, separation is possible through changing the method of preparation of the solution used for electrolysis.

Furthermore, when Ag/AgCl is used as a reference electrode, Cu's redox potentials for $Cu^+/Cu$ and $Cu^{2+}/Cu$ are −0.325V and 0.014 V, respectively, which are smaller than Ag's redox potential (0.603 V). Additionally, such values are larger than those for other metals mentioned above. Due to this fact, it is also possible to separate and recover Cu, Ag, and the like from other metals through electrolysis.

In regards to the recycling of In and Ag, conventional HCl is not used. Thus, the effect of improvement of the speed of solubility concerning indium oxide ($In_2O_3$) and the like can be caused. Moreover, an HF solution is used. Thus, it is difficult to dissolve metals such as lead used for wiring and the like. For the most part, it is easy to dissolve metal oxides such as $SiO_2$, $In_2O_3$, and the like, and solution preparation can be conducted more easily at room temperature. The effect of low-energy economical metal recycling of rare earth metals such as In, noble metals such as Ag, or metals such as Zn, Sn, and the like for the industrial use can be realized.

In regards to rare-earth metals such as Y, Eu, La, Tb, and the like, oxides are insoluble in the HF solution mentioned above, and thus separation is easier. Preparation using an acidic aqueous solution such as an $HNO_3$ solution is possible at room temperature. Such effect can be caused.

Furthermore, $H_2O_2$ is added to an HF solution. Due to this, it is possible to simultaneously dissolve Cu and copper oxides ($Cu_2O$ and CuO) or copper hydroxides ($Cu(OH)_2$) at the same time at room temperature. It is also possible to recover metal copper without conducting electrolysis at room temperature.

Therefore, the highly significant effect of enabling low-energy economical recycling of metal copper is possible. Additionally, only chemical reactions are used. Thus, in addition, it is possible to achieve the effect of recycling to produce highly pure metal copper. Furthermore, when printed circuit boards using lead-containing solders are simultaneously dissolved, after the precipitation of metal copper, it is also possible to recover lead through electrolysis.

Furthermore, the effect of enabling easy separation and recovery of Ag, Sn, Cu, and the like from wasted copper wiring printed circuit boards using lead-free solder is also possible.

It is not necessary to conduct reduction through electrolysis in the copper recycling of the present invention. However, it is also possible to conduct reduction and recovery of copper through electrolysis.

The present invention is also suitable for separation and recovery of metals from metal thin films and metal-oxide thin films formed on glass substrates. This is applicable to other metals as well as to the metals stated in the embodiment of the present invention.

In regards to the method of recycling useful metals of the present invention, an HF solutions is mainly used. It is also possible to use a waste HF solution from semiconductor factories and an HF solution recycled based on an aforementioned solution, and then preparation of solution and precipitation at room temperature are possible. An effect is provided allowing economic efficiency and decrease in burdens on the environmental load, such as with the emission of lower amounts of carbon dioxide ($CO_2$) and the like.

Additionally, the method of recycling useful metals of the present invention can be conducted after recycling of silicate glasses disclosed in patent document 8 of the conventional art (Patent document 8: Kokai (unexamined patent publication) No. 2000-335915).

As such, the present invention will have enormous effects concerning metal recycling.

Means of Solving the Problems

In order to solve the problems mentioned above, the following invention is provided.

The present invention provides a method for recycling useful metals, comprising a first powderization process wherein one or more of various forms of flat panel display waste of liquid crystal display panels, organic EL (electroluminescence) panels, plasma displays, and the like, wasted cathode ray tubes, wasted fluorescent tubes, or wasted solar panels is crushed simultaneously and finely powdered, a dissolution process wherein the powdered materials are dissolved at least until the glass is completely dissolved by a hydrofluoric acid solution and disappears, a first filtration process wherein the solution is filtered and various insoluble metal oxides, various metal fluorides, various metals, and the like are removed, and a first useful metal recovery process wherein electrolysis takes place in relation to a filtrate containing various metal ions, and various first useful metals are precipitated and recovered.

The second invention provides the method for recycling useful metals based on the first invention, comprising a second dissolution process, which causes insoluble sediment contained in the filtered substances removed through the first filtration process to be dissolved in pure water and further comprising a second useful metal recovery process, which causes various second useful metals to be precipitated and recovered based on electrolysis of the solution generated through the second dissolution process.

The third invention provides the method for recycling useful metals based on the first invention, comprising a second dissolution process, which causes insoluble sediment contained in the filtered substances removed through the first filtration process to be dissolved in pure water, a second filtration process, which filters the solution generated through the second dissolution process and removes insoluble sediment, a third dissolution process, which causes insoluble sediment contained in the filtered substances removed from the second filtration process to be dissolved in hydriodic solution, and a third useful metal recovery process, which causes various third useful metals to be precipitated and recovered based on electrolysis of the solution generated through the third dissolution process.

The fourth invention provides the method for recycling useful metals based on the first invention, comprising a fourth dissolution process wherein the insoluble various metal oxides and various metal fluorides contained in the filtered substances that have been removed from the first filtration process are dissolved in a nitric acid aqueous solution, and/or a hydrochloric acid aqueous solution, and/or a sulfuric acid aqueous solution and a fourth useful metal recovery process, which causes various fourth useful metals to be precipitated and recovered based on electrolysis of the solution generated through the fourth dissolution process.

The fifth invention provides the method of recycling useful metals based on the first invention, comprising a fifth dissolution process that causes the copper contained in the filtered substances removed from the first filtration process to be dissolved in a solution containing hydrofluoric acid and hydrogen peroxide oxidation and a fifth useful metal recovery process wherein silicon substrates, aluminum plates, aluminum wires, and the like are immersed in the aforementioned solution and metal thin films are deposited and recovered.

The sixth invention provides a method for recycling useful metals, comprising a first powderization process wherein one or more of various forms of flat panel display waste of liquid crystal display panels, organic EL (electroluminescence) panels, plasma display, and the like, wasted cathode ray tubes, or wasted fluorescent tubes is crushed simultaneously and finely powdered, a first dissolution process wherein the powdered materials are dissolved at least until the glass is completely dissolved by a hydrofluoric acid solution and disappears, a first filtration process wherein the solution is filtered and insoluble various metal oxides, various metal fluorides, various metals, and the like are removed, a fourth dissolution process wherein the insoluble various metal oxides, various metal fluorides, various metals, and the like removed from the first filtration process are dissolved in a nitric acid aqueous solution, and/or an hydrochloric acid solution, and/or a sulfuric acid aqueous solution, and a fourth useful metal recovery process useful metal recovery process, which causes various fourth useful metals to be precipitated and recovered based on electrolysis of the solution generated through the fourth dissolution process.

The seventh invention provides the method for recycling useful metals based on the fourth invention or the sixth invention, comprising a precipitation process, which heats the solution generated through the fourth dissolution process and, following the cooling such solution, precipitated metal salts, a sixth dissolution process, which causes the metal salts to be dissolved in pure water, and a sixth useful metal recovery process, which causes various sixth useful metals to be precipitated and recovered based on electrolysis of the solution generated through the sixth dissolution process.

The eighth invention provides a method of recycling useful metals, comprising a second powderization process wherein one or more of various forms of flat panel display waste of liquid crystal display panels, organic EL (electroluminescence) panels, plasma displays, and the like, wasted integrated circuits, wasted printed circuit boards, harnesses for in-car copper wiring, power cables, electric wires for energy transmission and distribution, coaxial cables, twin-lead type feeders, copper wiring, and the like is crushed simultaneously and finely powdered, a second powderization process, which causes powderization as needed, a seventh dissolution process, which causes the powder to be dissolved in a solution containing hydrofluoric acid and hydrogen peroxide oxidation, and a useful metal recovery process wherein silicon substrates, aluminum plates, aluminum wires, and the like are immersed in the aforementioned solution and metal thin films are deposited and recovered.

The ninth invention provides the method for recycling useful metals based on the fifth invention or the eighth invention further comprising an eighth useful metal recovery process, which precipitates and recovers ionized metals through electrolysis prior to or following the fifth useful metal recovery process or the seventh useful metal recovery process.

The tenth invention provides the method for recycling useful metals based on the fifth invention or the eighth invention, comprising a third filtration process, which filters the solution generated through the fifth dissolution process or the seventh dissolution process prior to or following the fifth useful metal recovery process or the seventh useful metal recovery process and removes insoluble sediment, an eighth dissolution process, wherein the sediment obtained through the third filtration process is dissolved in acid aqueous solution, such as a nitric acid aqueous solution, and a ninth useful metal recovery process, which precipitates and recovers ionized metals through electrolysis of the solution generated through the eighth dissolution process.

The eleventh invention provides the method for recycling useful metals based on the tenth invention comprising a fourth filtration process, which filters the solution generated through the eighth dissolution process and removes insoluble sediment, a ninth dissolution process, wherein the sediment obtained through the fourth filtration process is dissolved in a hydriodic acid solution, and a tenth useful metal recovery process, which precipitates and recovers various tenth useful metals based on electrolysis of the solution generated through the ninth dissolution process.

The twelfth invention provides the method for recycling useful metals based on the first invention or the second invention wherein the first useful metals and the second useful metals are indium, zinc, silver, and the like.

The thirteenth invention provides the method for recycling useful metals based on the third invention wherein the third useful metal is tin.

The fourteenth invention provides the method for recycling useful metals based on the fourth invention or the sixth invention wherein the fourth useful metals are rare earth metals, such as yttrium, europium, lanthanum, terbium ions, gadolinium, and the like, as well as antimony and lead.

The fifteenth invention provides the method for recycling useful metals based on the seventh invention wherein the sixth useful metals are rare earth metals, such as yttrium, europium, lanthanum, terbium ions, gadolinium, and the like.

The sixteenth invention provides the method for recycling useful metals based on the fifth invention or the eighth invention wherein the fifth useful metal and the seventh useful metal is copper.

The seventeenth invention provides the method for recycling useful metals based on the ninth invention wherein the eighth useful metals are zinc, silver, and copper.

The eighteenth invention provides the method for recycling useful metals based on the tenth invention wherein the ninth useful metals are lead, silver, and copper.

The nineteenth invention provides the method for recycling useful metals based on the eleventh invention wherein the tenth useful metal is tin.

Herein, process flowcharts concerning the embodiments of the method of recycling useful metals of the present invention are shown in FIG. 2 and FIG. 3. Additionally, process flowcharts concerning the method of recycling useful metals of the present invention indicated based on the claims are shown in FIG. 25 and FIG. 26.

The embodiments of the present invention are explained hereinafter based on FIG. 2, FIG. 3, FIGS. 25 (A) and (B), and FIG. 26. In addition, the section marked with "See "B" below" in FIG. 25 (A) is continued in the "B" section of FIG. 25 (B).

FIRST EMBODIMENT

Recovery of Indium and Tin from Transparent Electrode (ITO) (FIG. 2 and FIG. 25)

The present embodiment mainly relates to claims 1, 2, and 3.

<First Dissolution Process Preliminary Experiment 1 (in Case that $SiO_2$ is not Contained)>

According to the present embodiment, with due consideration given to the fact that a transparent electrode (ITO) contains indium oxide ($In_2O_3$) and tin oxide ($SnO_2$), the degree of solubility of $In_2O_3$ and $SnO_2$ in a hydrofluoric acid (HF) aqueous solution was examined.

First, the solubility when indium oxide ($In_2O_3$) was dissolved in a hydrofluoric acid (HF) aqueous solution of semiconductor grade was examined. Pure water was added to an HF solution with 49% HF concentration by weight. HF concentrations ranged from 10% by weight to 49% by weight. $In_2O_3$ powder with a purity of 99.99% was dissolved in a 100 g hydrofluoric acid (HF) solution. The degree of solubility at 24° C. was examined. The results thereof are shown in FIG. 4. In regards to processing of $In_2O_3$ films, generally, aqua regia consisting primarily of HCl and $HNO_3$ is used. It has been revealed that the same is soluble in an HF solution. Additionally, in FIG. 4, the maximum HF concentration was with 10% HF concentration by weight. When the value was higher than that of the aforementioned case, the degree of solubility of $In_2O_3$ tended to decline, and saturation took place at an HF concentration of 30% or greater by weight. That is to say, according to FIG. 4, the scope of the HF concentration of the present embodiment is preferably 5% by weight through 15% by weight, and further preferably 10% by weight.

Next, in regards to the degree of solubility of $SnO_2$, 1.0 g $SnO_2$ powder with a purity of 98.0% was added to a 100 g hydrofluoric acid (HF) aqueous solution with 10% HF concentration by weight, and the resultant was stirred for 24 hours. However, such powder did not dissolve at all. After separation and drying of sediment, the weight was measured. The resulting weight was found to be about 1.0 g. As a result, it was revealed that $SnO_2$ was not soluble in the HF solution.

<First Useful Metal Recovery Process Preliminary Experiment 1 (in Case that $SiO_2$ is not Contained)>

A solution resulting when 3 g of $SnO_2$ powder was dissolved in a 100 g hydrofluoric acid (HF) solution with 10% HF concentration by weight, concerning which the degree of solubility of $In_2O_3$ was large, was used. Based on the equipment configuration shown in FIG. 5, electrolysis was conducted for 20 hours at solution temperature of 24° C. under conditions of an applied DC voltage of 3.0 V and an average current of 25 mA. Platinum (Pt) plates that were not dissolved in an HF solution were used for electrodes. Precipitation of a substance with a color close to white was observed on the cathode-side platinum electrode. Based on X-ray diffraction analysis, X-ray chart as shown in FIG. 6 was obtained. Diffraction peaks for the crystal face orientations of (101), (002), (110), (112), (103), and (202) were obtained under conditions in which the diffraction angle 2θ was 33.1, 36.55, 39.35, 54.55, 63.45, and 69.2 degrees, respectively. As a result, the obtained substance was revealed to be indium (In) crystals.

As stated with regard to the preliminary experiments mentioned above, it was revealed that $In_2O_3$ was soluble in an HF solution and In recovery was possible with electrolysis of an HF solution in which $In_2O_3$ was dissolved.

<First Dissolution Process Preliminary Experiment 2 (in Case that $SiO_2$ is Contained)>

Next, in order to apply the present method to actual wasted flat panel displays in a simulated manner, a solution was created under conditions such that 5.8 g high-purity silica gel powder was dissolved and saturated in a 100 g HF solution of semiconductor grade with 49% HF concentration by weight, which was diluted to 10% HF concentration by weight with pure water. 1.0 g $In_2O_3$ powder with a purity of 99.99% was dissolved in the aforementioned solution, and thus the resulting solution was prepared. At this time, gelled sediment was created and filtered using a filter.

<First Useful Metal Recovery Process Preliminary Experiment 2 (in Case that $SiO_2$ is Contained)>

Next, using the aforementioned filtered solution, based on the equipment configuration shown in FIG. 5, electrolysis was conducted for 3.5 hours at solution temperature of 24° C. under conditions of a DC average applied voltage of 3.7 V and an average current of 24 mA. Platinum (Pt) plates that were not dissolved in a HF solution were used for electrodes. As stated above, even when $SiO_2$ is dissolved, precipitation (weight: 0.46 g) of a substance that was close to white in color was observed on the cathode-side platinum electrode. Based on X-ray diffraction analysis, X-ray diffraction chart shown in FIG. 7 was obtained. Diffraction peaks for the crystal face orientations of (101), (112), (200), (103), and (213) were obtained under conditions in which the diffraction angle 2θ was 32.90, 54.40, 56.55, 63.20, and 90.05 degrees, respectively. As a result, the obtained substance was revealed to be indium (In) crystals.

<Second Dissolution Process and Second Useful Metal Recovery Process Preliminary Experiment>

Next, while applying ultrasonic wave, 0.41 g of gelled sediment obtained through the dissolution process preliminary experiment 2 mentioned above was dissolved in 100 g of pure water. In the same manner as that mentioned above, based on the equipment configuration shown in FIG. 5, electrolysis was conducted for 5 hours at solution temperature of 24° C. under conditions of a DC average applied voltage of 5.0 V and an average current of 1 mA. Platinum (Pt) plates that were not in an HF solution were used for electrodes.

As stated in the same manner as above, precipitation (weight: 0.01 g) of substances close to white in color was observed on the platinum electrode on the cathode side. Based on X-ray diffraction analysis, X-ray diffraction chart shown in FIG. 8 was obtained. Diffraction peaks for the crystal face orientations of (101) and (002) were obtained under conditions in which the diffraction angle 2θ was 33.05 and 36.45 degrees, respectively. As a result, the obtained substance was revealed to be indium (In) crystals.

<Main Experiment>

Subsequently, the present invention was applied in actuality using wasted liquid crystal display panels from personal computers.

First, the wasted 14-inch liquid crystal display panels from personal computers were broken down. Following the collection of liquid crystals, the glass substrates were washed with a neutral detergent and liquid crystals were completely removed. Following crushing of such glass substrates, powderization using a mixer took place (first powderization process).

Next, the aforementioned 100 g of powder obtained through the first powderization process was dissolved in an HF solution resulting when an HF solution of semiconductor grade with 49% HF concentration by weight was diluted to 10% HF concentration by weight with pure water (first dissolution process). The solution generated through the first dissolution process was filtered and insoluble sediment and filtrates were separated (first filtration process).

Thereafter, using a 50 g filtrate solution obtained through the first filtration process, based on the equipment configuration shown in FIG. 5, electrolysis was conducted for 48 hours at solution temperature of 24° C. under conditions of a DC average applied voltage of 4.18 V and an average current of 21 mA. Platinum (Pt) plates which were not dissolved in HF solutions were used for electrodes (first useful metal recovery process). Through the aforementioned electrolysis, in the same manner as a case of in which $In_2O_3$ and $SiO_2$ were dissolved in an HF solution as stated above, precipitation (weight: 0.02 g) of a substance close to white in color was observed on the platinum electrode on the cathode side. Based on X-ray diffraction analysis, X-ray diffraction chart shown in FIG. 9 was obtained. Diffraction peak for the crystal face orientations of (101) was obtained under conditions in which the diffraction angle 2θ was 33.05 degree, respectively. As a result, the obtained substance was revealed to be indium (In) crystals.

Next, the filtrates (gelled sediment) obtained through the first filtration process were dissolved in the pure water (second dissolution process). Using the solution generated through the second dissolution process, based on the equipment configuration shown in FIG. 5, electrolysis was conducted for 5 hours at solution temperature of 24° C. under conditions of a DC average applied voltage of 5 V and an average current of 1 mA by applying platinum (Pt) electrodes. As a result, in the same manner as stated above, indium (In) crystals were acquired.

Based on the results mentioned above, it was revealed that it is possible to recover In from the glass substrates of the wasted liquid crystal display panels with the use of the present method. In addition, according to the present embodiment, glass substrates of liquid crystal display panels were used. However, the present embodiment can be applied to various forms of flat panel display waste of organic EL (electroluminescence) panels, plasma displays, and the like, as well as solar panels.

Additionally, as stated above, when crushed or finely-powdered wastes of flat panel displays and the like and wasted solar panels are dissolved in an HF solution, tin oxide ($SnO_2$) is insoluble in the HF solution and is deposited. Thus, it is possible to separate and recover the same by filtration. Such $SnO_2$ is soluble in hydroiodic acid. Making use of this fact, following dissolving of $SnO_2$ in an HF solution, it is possible to recover metal tin via a method of electrolysis (third dissolution process and third useful metal recovery process).

Second Embodiment

Recovery of Zinc from Zinc Oxides for Transparent Electrode

The present embodiment mainly relates to claims 1, 2, and 3, and describes a method for recovering zinc from zinc oxides, the use of which as an alternative metal to indium for transparent electrodes is underway.

<First Dissolution Process Preliminary Experiment 1 (in Case that $SiO_2$ is not Contained)>

First, the solubility of ZnO in an HF solution was examined. The HF concentration was adjusted by adding pure water to a hydrofluoric acid (HF) solution of semiconductor grade with 49% HF concentration by weight. The degree of solubility when ZnO (purity: 99%) powder at 24° C. was dissolved in a 100 g HF solution was examined. The result thereof is shown in FIG. 10. According to FIG. 10, ZnO was revealed to be soluble in an HF solution. As HF concentration increased, the degree of ZnO solubility increased. The maximal HF concentration was 40% by weight. When the HF concentration was further increased, the degree of solubility tended to decline. That is to say, according to FIG. 10, the scope of HF concentration of the present embodiment is preferably 30% by weight through 45% by weight, and further preferable 40% by weight.

<Second Dissolution Process and Second Useful Metal Recovery Process Preliminary Experiment 1 (in Case that $SiO_2$ is not Contained)>

Next, 9.5 g ZnO powder with a purity of 99.99% was dissolved in a 100 g HF aqueous solution with 30% HF concentration by weight, and sediment was obtained. Such sediment was filtered with a filter and dried. As a result, 5.86 g of a white substance was obtained. 1.6 g of such white substance was dissolved in pure water. Following such process, based on the equipment configuration shown in FIG. 5, electrolysis was conducted for 1 hour at solution temperature of 24° C. under conditions of a DC average applied voltage of 3.6 V and an average current of 3.0 mA. Platinum (Pt) plates and copper (Cu) plates were respectively used for anodes and cathodes. Both platinum plates and copper plates are insoluble in HF. Precipitation of a substance in close to grey color was observed on the copper electrode on the cathode side. Based on X-ray diffraction analysis, the X-ray diffraction chart shown in FIG. 11 was obtained. Diffraction peaks for the crystal face orientations of (002), (100), (101), (102), (103), (110), (112), (201), and (104) were obtained under conditions in which the diffraction angle 2θ was 36.45, 39.15, 43.40, 54.50, 70.25, 70.80, 82.25, 86.70, and 90.10 degrees, respectively. As a result, the obtained substance was revealed to be zinc (Zn) crystals.

In addition, using the solution generated through the first dissolution process preliminary experiment 1 of the present embodiment, when electrolysis was conducted in the same manner as stated above (first useful metal recovery process), an X-ray analysis chart was obtained in the same manner as that of FIG. 11. That is to say, zinc (Zn) crystals were acquired.

<First Dissolution Process, Second Dissolution Process, and Second Useful Metal Recovery Process Preliminary Experiment 2 (in Case that $SiO_2$ is Contained)>

Furthermore, in order to apply the present method to actual wasted flat panel displays, in the same manner as in the first embodiment, in a simulated manner, a solution was prepared under conditions in which high-purity silica gel ($SiO_2$) powder was dissolved. 6.0 g of high-purity silica gel ($SiO_2$) powder was dissolved and saturated in a 100 g HF solution of semiconductor grade with 49% HF concentration by weight. Thereafter, 0.6 g of ZnO powder of 99.0% purity was dissolved and a solution was prepared so that the ratio by weight between $SiO_2$ and ZnO became 10:1. In the same manner as stated above, gelled sediment was created. 0.92 g of a white substance obtained through filtering with a filter and drying the aforementioned sediment was dissolved in pure water. Following this process, based on the equipment configuration shown in FIG. 5, electrolysis was conducted for 1.25 hours at solution temperature of 24° C. under conditions of a DC average applied voltage of 4.0 V and an average current of 0.9 mA. Platinum (Pt) plates and copper (Cu) plates were used for anodes and cathodes, respectively. Both platinum plates and copper plates are insoluble in HF. Precipitation of a substance close to grey in color was observed on the copper electrode on the cathode side. Based on X-ray diffraction analysis, the X-ray diffraction chart shown in FIG. 12 was obtained. Diffraction peaks for the crystal face orientations of (002), (100), (101), (102), (103), and (104) were obtained under conditions in which the diffraction angle 2θ was 36.20, 38.85, 43.15, 54.20, 70.00, and 89.90 degrees, respectively. As a result, the obtained substance was revealed to be zinc (Zn) crystals in the same manner as stated above.

Based on the results mentioned above, it was revealed that it is possible to recover Zn from glass substrates of wasted liquid crystal display panels using ZnO transparent electrodes, which are expected to take place in the future. In addition, according to the present embodiment, glass substrates of liquid crystal display panels were used. However, the present embodiment can be applied to various types of flat panel display wastes from organic EL (electroluminescence) panels, plasma displays, and the like, as well as solar panels.

As stated above, an HF solution has the characteristic of dissolving glass contained in the aforementioned wastes. Therefore, by conducting the process of dissolving wastes in an HF solution until glass contained in the wastes are dissolved and have disappeared completely, it is possible to dissolve all useful metals attached to the glass. As a result, the rate of recovery of useful metals via electrolysis thereafter (such as a first useful metal recovery process) is improved. Additionally, it is possible to completely separate useful metals described hereinafter that are not dissolved in an HF solution from glass. It is also possible to recover useful metals efficiently via treatment thereafter as explained hereinafter (such as a fourth useful metal recovery process).

In addition, based on the solubility of an HF solution, it is possible to simultaneously dissolve more than one of the crushed and finely-powdered wastes mentioned above. As a result, in the process of industrial production, it is expected that work efficiency will be remarkably improved.

Third Embodiment

Recovery of Rare-Earth Metals, Such as Yttrium, Europium, Lanthanum, Terbium, and the Like from Fluorescent Materials The present embodiment mainly relates to claims 4, 6, and 7.

<First Dissolution Process and Fourth Dissolution Process Preliminary Experiment>

First, the solubility of yttrium oxide ($Y_2O_3$), europium oxide ($Eu_2O_3$), lanthanum oxide ($La_2O_3$), and terbium oxide ($Tb_4O_7$), which are heavily used for fluorescent materials, in an HF solution was examined.

As an acidic aqueous solution, an HF solution of semiconductor grade of 49% concentration, a nitric acid aqueous ($HNO_3$) solution of 10% concentration, a sulfuric acid aqueous ($H_2SO_4$) solution of 10% concentration, and a hydrochloric acid (HCl) solution of 10% concentration were used. $Y_2O_3$ powder of 99.99% purity, $Eu_2O_3$ powder of 99.9% purity, $La_2O_3$ powder of 98.0% purity, and $Tb_4O_7$ powder of 99.95% purity were dissolved in separate samples of the a 100 g solution mentioned above at 24° C. The solubility in such cases are indicated in Table 1.

TABLE 1

| | Solubility (g) | | | |
|---|---|---|---|---|
| | $Y_2O_3$ | $Eu_2O_3$ | $La_2O_3$ | $Tb_4O_7$ |
| HF solution of 49% concentration | 0 | 0 | 0 | 0 |
| Hydrochloric acid (HCl) aqueous solution of 10% concentration | 0.05 | 0.40 | 26.5 | 1.5 |
| Nitric acid ($HNO_3$) aqueous solution of 10% concentration | 7.4 | 20 | 10.5 | 11.8 |
| Sulfuric acid ($H_2SO_4$) aqueous solution of 10% concentration | 8 | 6 | — | — |

It was revealed that $Y_2O_3$, $Eu_2O_3$, $La_2O_3$, and $Tb_4O_7$ were insoluble in an HF solution and the solubility for an $HNO_3$ solution and an $H_2SO_4$ solution were greater than that for an HCl solution. In addition, the aforementioned results indicate that it is possible to separate and recover $Y_2O_3$, $Eu_2O_3$, $La_2O_3$, and $Tb_4O_7$ as sediment (filtrates) through undertaking the first dissolution process and first filtration process as stated in the first embodiment.

<Fourth Useful Metal Recovery Process Preliminary Experiment (Recovery of Yttrium)>

Next, insoluble $Y_2O_3$, was separated and recovered from a saturated solution whereby 7.4 g of $Y_2O_3$, powder was added to a 100 g HF solution of 49% of concentration, and the resultant was washed with pure water twice for 10 minutes. Following such process, the same was dissolved in a 50 g $HNO_3$ solution with 10% $HNO_3$ concentration by weight. Based on the equipment configuration shown in FIG. 5, electrolysis was conducted for 20 hours at solution temperature of 24° C. under conditions of an applied DC voltage of 3.33 V and an average current of 1.91 mA. Platinum (Pt) plates were used for electrodes in the same manner as in the first embodiment. Precipitation of a substance that was close to white in color was observed on the platinum electrode on the cathode side. Based on X-ray diffraction analysis, the X-ray diffraction chart shown in FIG. 13 was obtained. Diffraction peaks for the crystal face orientations of (100), (110), (200), and (112) were obtained under conditions in which the diffraction angle 2θ was 28.05, 50.15, 58.35, and 60.02 degrees, respectively. As a result, the obtained substance was revealed to be yttrium (Y) crystals.

Based on the results mentioned above, it was revealed that it is possible to separate and recover yttrium.

<Main Experiment>

Next, using wasted fluorescent tube glass, yttrium (Y) was recovered by applying the present invention in actuality.

First, electrode sections of FL type wasted fluorescent tube (40W) were cut off and the glass portions alone were carved out. At the same time, mercury (Hg) within the wasted fluorescent tubes was recovered. The carved glass portions were crushed and finely powdered with a mixer (first powderization process).

Subsequently, 100 g of wasted fluorescent tube glass powder was added to a 100 cc HF solution of semiconductor grade with 49% HF concentration by weight, the resultant was stirred for 24 hours, and dissolution took place. At this time, silica glass components were mainly dissolved. Thus, other substances existed as metal ions in the solution, or became deposited as insoluble metal oxides and metal fluorides (first dissolution process). The solution generated through the first dissolution process was filtered and insoluble sediment and filtrates were separated (first filtration process).

Thereafter, the filtered substance (insoluble sediment) separated and recovered through the first filtration process was washed with pure water twice for 10 minutes. Following such process, the resultant was dissolved in a 50 cc $HNO_3$ solution with 10% $HNO_3$ concentration by weight (fourth dissolution process). Thereafter, based on the equipment configuration shown in FIG. 5, electrolysis was conducted for 20 hours at solution temperature of 24° C. under conditions of an applied DC voltage of 3.3 V and an average current of 1.85 mA (fourth useful metal recovery process).

When X-ray diffraction analysis was conducted concerning precipitation of the substance obtained through the fourth useful metal recovery process, an X-ray diffraction chart was obtained in the same manner as that when yttrium was recovered from $Y_2O_3$ as stated above. That is to say, yttrium (Y) was obtained.

Based on the results mentioned above, it was revealed that it is possible to recover yttrium used for fluorescent materials from wasted fluorescent tube glass. In addition, according to the present embodiment, wasted fluorescent tube glass was used. However, the same outcome would be obtained when various wastes, such as cold cathode fluorescent tubes for backlights of liquid crystal display panels, organic EL (electroluminescence) panels, plasma displays, cathode ray tubes, and the like are used.

<Precipitation Process, Sixth Dissolution Process, and Sixth Useful Metal Recovery Process Preliminary Experiment 1 (Recovery of Europium)>

Next, 12.7 g of $Eu_2O_3$ powder was dissolved in a 50 g $HNO_3$ solution with 10% $HNO_3$ concentration by weight. And such 20 g solution was heated using a hot stirrer for about 4 hours at a temperature of about 50° C. Thereafter, such solution was cooled for 21 hours within a refrigerator at a temperature of 4° C. White coagulation of 8.40 g by weight was obtained.

Such white coagulation was dissolved in 100 g of pure water. Based on the equipment configuration shown in FIG. 5, electrolysis was conducted for 16.5 hours at solution temperature of 24° C. under conditions of an applied DC voltage of 3.00 V and an average current of 2.35 mA. Platinum (Pt) plates were used for electrodes. Precipitation of a brownish-red substance was observed on the platinum electrode on the cathode side. Based on X-ray diffraction analysis, the X-ray diffraction chart shown in FIG. 14 was obtained. Diffraction peaks for the crystal face orientations of (110) and (112) were obtained under conditions in which the diffraction angle 2θ was 27.85 and 49.60 degrees, respectively As a result, the obtained substance was revealed to be europium (Eu) crystals.

<Precipitation Process, Sixth Dissolution Process, and Sixth Useful Metal Recovery Process Preliminary Experiment 2 (Recovery of Lanthanum)>

Next, 18.0 g of $La_2O_3$ powder was dissolved in a 50 g HCl solution with 10% HCl concentration by weight. Such 20 g solution was heated using a hot stirrer for about 4 hours at a temperature of about 50° C. Thereafter, such solution was cooled for 18 hours within a refrigerator at a temperature of 4° C. A white coagulation of 5.48 g by weight was obtained.

Such white coagulation was dissolved in 100 g of pure water. Based on the equipment configuration shown in FIG. 5, electrolysis was conducted for 18 hours at solution temperature of 24° C. under conditions of an applied DC voltage of 2.60 V and an average current of 1.77 mA. Platinum (Pt) plates were used for electrodes. Precipitation of a grey substance was observed on the platinum electrode on the cathode side. Based on X-ray diffraction analysis, the X-ray diffraction chart shown in FIG. 15 was obtained. Diffraction peaks for the crystal face orientations of (100), (101), (105), and (110) were obtained under conditions in which the diffraction angle 2θ was 26.40, 28.40, 46.85, and 48.05 degrees, respectively As a result, the obtained substance was revealed to be lanthanum (La) crystals.

<Precipitation Process, Sixth Dissolution Process, and Sixth Useful Metal Recovery Process Preliminary Experiment 3 (Recovery of Terbium)>

Next, 11.8 g of $Tb_4O_7$ powder was dissolved in a 100 g $HNO_3$ solution with 10% $HNO_3$ concentration by weight. Such 10 g solution was heated using a hot stirrer for about 4 hours at a temperature of about 50° C. Thereafter, such solution was cooled for 18 hours within a refrigerator at a temperature of 4° C. A white coagulation of 3.25 g by weight was obtained.

Such white coagulation was dissolved in 100 g of pure water. Based on the equipment configuration shown in FIG. 5, electrolysis was conducted for 18 hours at solution temperature of 24° C. under conditions of an applied DC voltage of 2.48 V and an average current of 1.77 mA. Platinum (Pt) plates were used for electrodes. Precipitation of a silver-white substance of 0.02 g by weight was observed on the platinum electrode on the cathode side. Based on X-ray diffraction analysis, such substance was revealed to be terbium (Tb) crystals.

Based on the results mentioned above, it was revealed that it is possible to separate and recover europium (Eu), lanthanum (La), and terbium (Tb). In addition, through the precipitation process, sixth dissolution process, and sixth useful metal recovery process, it is also possible to separate and recover rare earth metals, such as yttrium (Y), gadolinium (Gd), and the like.

According to the present embodiment, the same outcome would be acquired when various wastes, such as wasted fluorescent tube glasses, cold cathode fluorescent tubes for backlights of liquid crystal display panels, organic EL (electroluminescence) panels, plasma display panels, cathode ray tubes, and the like are used.

Fourth Embodiment

Recovery of Antimony, Lead and Tin

The present embodiment mainly relates to claims 4, 6, 10, and 11, and describes a method for recovery of antimony and lead contained in fluorescent tube glass, cathode ray tubes as oxides, and the like, as well as tin and lead contained in solders.

<First Dissolution Process Preliminary Experiment>

First, antimony oxide ($Sb_2O_3$) powder of 98.0% purity was dissolved at 24° C. in a 100 g HF solution with 49% HF concentration by weight. When the solubility was examined, the result was 83 g. Additionally, lead oxide (PbO) powder of 99.0% purity was dissolved at 24° C. in a 100 g HF solution with 49% HF concentration by weight. As a result, sediment that seemed to be lead fluoride was obtained. The degree of solubility was unclear.

<Fourth Useful Metal Recovery Process Preliminary Experiment 1 (Recovery of Antimony)>

Next, 10 g of antimony oxide ($Sb_2O_3$) powder of 98.0% purity was dissolved in a 100 g HF solution with 49% HF concentration by weight. Based on the equipment configuration shown in FIG. 5, electrolysis was conducted for 24 hours at solution temperature of 24° C. under conditions of an applied DC voltage of 2.30 V and an average current of 100 mA. Platinum (Pt) plates were used for electrodes. Precipitation of a grey substance of 3.63 g by weight and 1.0 mm in thickness was obtained on the platinum electrode on the cathode side. Based on X-ray diffraction analysis, the X-ray diffraction chart shown in FIG. 16 was obtained. Diffraction peaks for the crystal face orientations of (003), (101), (012), (104), (110), (015), (006), (202), (024), (107), (116), (122), (108), (214), (300), (119), and (312) were obtained under conditions in which the diffraction angle 2θ was 23.65, 25.3, 28.8, 40.15, 42.15, 47.25, 48.5, 51.7, 59.55, 63.1, 66.15, 68.9, 71.75, 76.05, 76.65, 91.5, and 98.6 degrees, respectively As a result, the obtained substance was revealed to be antimony (Sb) crystals. In addition, Sb precipitation thickness was 1 mm, which was substantial. No diffraction peak for platinum electrodes could be observed.

<Main Experiment>

Next, using wasted fluorescent tube glass, antimony (Sb) was recovered by applying the present invention as in actuality.

First, electrode sections of FL type wasted fluorescent tubes (40 W) were cut, and only the glass portions were carved out. At the same time, mercury (Hg) within the wasted fluorescent tubes was recovered. The carved glass portions were crushed and finely powdered with a mixer (first powderization process).

Subsequently, 2.5 kg of wasted fluorescent tube glass powder was added to a 2.5 kg of HF solution of semiconductor grade with 49% HF concentration by weight, the resultant was stirred for 24 hours, and dissolution took place (first dissolution process). In regards to the solution generated through the first dissolution process, based on the equipment configuration shown in FIG. 5, electrolysis was conducted for 60 hours at solution temperature of 24° C. under conditions of an applied DC voltage of 2.50 V and an average current of 50 mA (first useful metal recovery process). Platinum (Pt) plates were used for electrodes. Precipitation of a black substance of about 0.2 g was observed on the platinum electrode on the cathode side. Based on X-ray diffraction analysis of such precipitation substance, no diffraction peak could be observed. Apparently, this is because Sb exists in the form of a chemical bond of Si—O—Sb of $SiO_2$ contained in fluorescent tube glass, and complete crystals cannot be separated through electrolysis from an HF solution.

Therefore, the precipitation substance was dissolved in a 100 g $HNO_3$ solution of 10% by weight (fourth dissolution process). Based on the equipment configuration shown in FIG. 5, electrolysis was conducted for 60 hours at solution temperature of 24° C. under conditions of an applied DC voltage of 1.0 V and an average current of 200 mA (fourth useful metal recovery process). As a result, precipitation of a grey substance of 0.05 g by weight was observed on the platinum electrode on the cathode side. Based on X-ray diffraction analysis, the X-ray diffraction chart shown in FIG. 17 was obtained. Diffraction peaks for the crystal face orientations of (012), (110), (202), (024), and (122) were obtained under conditions in which the diffraction angle 2θ was 28.15, 41.50, 51.25, 58.95, and 68.20 degrees, respectively. As a result, the obtained substance was revealed to be antimony (Sb) crystals.

<Fourth Useful Metal Recovery Process Preliminary Experiment 2 (Recovery of Lead)>

Subsequently, 1.0 g of lead oxide (PbO) powder with 98.0% purity was dissolved in an HF solution with 49% HF concentration by weight. Sediment that seemed to be lead fluoride was obtained. Such sediment was dissolved in a 100 g $HNO_3$ solution of 10% by weight. Based on the equipment configuration shown in FIG. 5, electrolysis was conducted for 24 hours at solution temperature of 24° C. under conditions of an applied DC voltage of 2.0 V and an average current of 200 mA. Platinum (Pt) plates were used for electrodes. Precipitation of about 0.03 g of a grey substance was observed on the platinum electrode on the cathode side. Based on X-ray diffraction analysis of such precipitation substance, the X-ray diffraction chart shown in FIG. 18 was obtained. Diffraction peaks for the crystal face orientations of (111), (200), (220), (311), (222), and (331) were obtained under conditions in which the diffraction angle 2θ was 31.25, 36.2, 52.3, 62.3, 65.25, and 85.80 degrees, respectively. As a result, the obtained substance was revealed to be lead (Pb) crystals.

<Main Experiment>

Subsequently, the present invention was applied in actuality using wasted cathode ray tube glass, and lead (Pb) was recovered.

First, the wasted cathode ray tubes were divided into panel sections and funnel sections. The funnel glass containing large amounts of lead was crushed and finely powdered with a mixer (first powderization process).

Subsequently, 2.5 kg of wasted funnel glass powder was added to a 2.5 kg HF solution of semiconductor grade with 49% HF concentration by weight, and the resultant was stirred for 24 hours and dissolved (first dissolution process). White sediment was separated through filtration (first filtration process).

In regards to the sediment (filtrate) obtained through the first filtration process, metals other than lead that were contained in the funnel glass remained. In order to separate them, such metals were dissolved in an HCl solution. 50 g of sediment was dissolved in a 100 g HCl solution of 10% concentration. As a result, white sediment was acquired (fourth dissolution process). Subsequently, 1 g of such white sediment was dissolved in a 100 g $HNO_3$ solution with 10% by weight. Based on the equipment configuration shown in FIG. 5, electrolysis was conducted for 24 hours at solution temperature of 24° C. under conditions of an applied DC voltage of 2.5 V and an average current of 100 mA. Platinum (Pt) plates were used for electrodes (fourth useful metal recovery process). Precipitation of a grey substance of about 0.02 g was observed on the platinum electrode on the cathode side. Based on X-ray diffraction analysis of such precipitation substance, the X-ray diffraction chart shown in FIG. 19 was obtained. Diffraction peaks for the crystal face orientations of (111), (200), (220), (311), (222), (331), and (420) were obtained under conditions in which the diffraction angle 2θ was 31.30, 36.30, 52.20, 62.25, 65.30, 85.85, and 88.25 degrees, respectively. As a result, the obtained substance was revealed to be lead (Pb) crystals.

According to the present embodiment, wasted fluorescent tube glass and wasted cathode ray tubes were separately treated. Using glass powder that resulted when the aforementioned powders were mixed, the same experiment was conducted. As a result, antimony and lead could be separated and recovered.

<Ninth Useful Metal Recovery Process Preliminary Experiment (Recovery of Lead)>

Furthermore, according to the present embodiment, separation and recovery of lead were conducted from Pb—Sn—Zn solders containing large amounts of lead. First, solder of 5 g by weight was immersed and dissolved in a 120 g $HF/H_2O_2$ mixed aqueous solution resulting when a 20 g hydrogen peroxide ($H_2O_2$) solution with 30% $H_2O_2$ concentration by weight was added to a 100 g HF solution of semiconductor grade with 49% HF concentration by weight, and precipitation took place. As a result, white sediment of 1.75 g by weight was obtained. Such sediment was dissolved in a 100 g $HNO_3$ solution with 10% $HNO_3$ concentration by weight.

Furthermore, white sediment was acquired. In regards to the solution obtained through filtration of such sediment by a filter, based on the equipment configuration shown in FIG. 5, electrolysis was conducted for 60 hours at solution temperature of 24° C. under conditions of an applied DC voltage of 2.4 V and an average current of 100 mA. Platinum (Pt) plates were used for electrodes. Precipitation of a grey substance of about 0.08 g by weight was observed on the platinum electrode on the cathode side. Based on X-ray diffraction analysis of such precipitation substance, the X-ray diffraction chart shown in FIG. 20 was obtained. Diffraction peaks for the crystal face orientations of (111), (200), (220), and (311) were obtained under conditions in which the diffraction angle 2θ was 31.15, 36.10, 52.20, and 62.05 degrees, respectively. As a result, the obtained substance was revealed to be lead (Pb) crystals.

<Main Experiment>

Subsequently, the present invention was applied in actuality using wasted copper wiring printed circuit boards. Lead (Pb) was collected.

An HF solution with 20% HF concentration by weight resulting when pure water was added to a 100 g HF solution of semiconductor grade with 49% HF concentration by weight was prepared. A 120 g HF/$H_2O_2$ mixed aqueous solution resulting when a 20 g hydrogen peroxide solution ($H_2O_2$) with 30% $H_2O_2$ concentration by weight was added to the aforementioned 100 g HF solution was prepared. A piece of printed circuit board with 2 $cm^2$ area was immersed in the aforementioned HF/$H_2O_2$ mixed aqueous solution at 24° C. and were left for 24 hours (fifth dissolution process or seventh dissolution process). At such time, the colorless HF/$H_2O_2$ mixed aqueous solution changed to become blue. About 1.0 g of sediment was obtained. Additionally, exterior changes could not be recognized regarding portions other than copper wiring of the printed circuit boards and components of integrated circuits. Copper (Cu) as mentioned in the fifth embodiment was obtained from the solution resulting when the sediment was filtered (fifth useful metal recovery process or seventh useful metal recovery process). The sediment obtained through filtration (third filtration process) was dissolved in a 100 g $HNO_3$ solution with 10% $HNO_3$ concentration by weight (eighth dissolution process). Based on the equipment configuration shown in FIG. 5, electrolysis was conducted for 60 hours at solution temperature of 24° C. under conditions of an applied DC voltage of 2.4 V and an average current of 100 mA (ninth useful metal recovery process). Precipitation of a grey substance was observed on the platinum electrode on the cathode side. Based on X-ray diffraction analysis of such precipitation substance, an X-ray diffraction chart shown as mentioned above was obtained.

Based on the results above, it is possible to separate and recover lead from solders containing large amounts of lead or solders of wasted printed circuit boards.

Additionally, when Pb—Sn—Zn solders were dissolved in the HF/$H_2O_2$ mixed aqueous solution, alloyed tin (Sn) became oxidized and assumed the form of $SnO_2$. Such $SnO_2$ is insoluble in $HNO_3$ solutions and becomes deposited. Thus, it is possible to separate and recover the same by filtration. As stated in the first embodiment, such $SnO_2$ is soluble in hydroiodic acid (HI). Making use of this fact, $SnO_2$ was dissolved in an HI solution. Thereafter, it is possible to recover metal tin via electrolysis (fourth filtration process, ninth useful metal recovery process, and tenth useful metal recovery process). Furthermore, in regards to zinc (Zn), it is also possible to separate and recover the same as stated in the second embodiment. Furthermore, it is possible to recover tin from Sn—Cu—Ag lead-free solders as well.

Fifth Embodiment

Recovery of Copper

The present embodiment mainly relates to claims 5 and 8.

<Fifth Dissolution Process and Seventh Dissolution Process Preliminary Experiment>

According to the present embodiment, the degree of solubility of lead used mainly for wiring materials in an HF solution was examined. First, an HF solution with 20% HF concentration by weight resulting when pure water was added to an HF solution of semiconductor grade with 49% HF concentration by weight was prepared. Next, the concentration of a hydrogen peroxide solution ($H_2O_2$) with 30% $H_2O_2$ by weight concentration was changed, and the aforementioned solution was added thereto. 6 g of copper (Cu) powder of 99.85% purity was dissolved at 24° C. in the HF/$H_2O_2$ mixed aqueous solution with a concentration differing from that mentioned above. The solution that had been colorless before copper addition changed to become blue. Here, metal copper was insoluble in an HF solution. Thus, due to $H_2O_2$ addition, dissolution took place based on the following reaction, and it can be thought that the relevant metal copper was transformed to result in tetrafluoride copper complex ions.

$$Cu + H_2O_2 \rightarrow Cu(OH)_2 \quad (1)$$

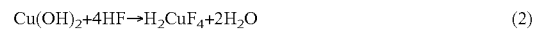
$$Cu(OH)_2 + 4HF \rightarrow H_2CuF_4 + 2H_2O \quad (2)$$

$$H_2CuF_4 \rightarrow 2H^+ + [CuF_4]^2 \quad (3)$$

The degree of solubility of copper with relation to hydrogen peroxide ($H_2O_2$) concentration when copper powder was dissolved in an HF/$H_2O_2$ mixed aqueous solution is shown in FIG. 21. Concerning hydrogen peroxide concentration, an almost stable degree of solubility was obtained within the scope of 20% to 60% concentration by weight.

<Fifth Useful Metal Recovery Process and Eighth Useful Metal Recovery Process Preliminary Experiment 1 (Usage of Si Substrate Fragments>

Next, a 100 g solution resulting when the aforementioned copper powder was dissolved in an HF/$H_2O_2$ mixed aqueous solution of 50% by weight hydrogen peroxide concentration was prepared. A piece of silicon (Si) substrate with 2 $cm^2$ area was immersed in the aforementioned mixed aqueous solution at 24° C., and metallic luster precipitation started to form on the surface of the Si substrate immediately thereafter. The same was left for 24 hours. The thickness of the precipitation increased and the blue solution changed to become colorless.

As a result of X-ray diffraction analysis of such precipitation substance, the X-ray diffraction chart shown in FIG. 22 was obtained. Diffraction peaks for the crystal face orientations of (111), (200), (220), (311), and (222) were obtained under conditions in which the diffraction angle 2θ was 43.3, 50.5, 74.2, 90.0, and 95.2 degrees, respectively. As a result, the obtained substance was revealed to be copper (Cu) crystals.

In regards to precipitation reaction related to the aforementioned copper, based on formula (3), the following formula can be assumed.

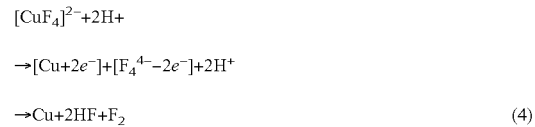
$$[CuF_4]^{2-} + 2H^+$$
$$\rightarrow [Cu + 2e^-] + [F_4^{4-} - 2e^-] + 2H^+$$
$$\rightarrow Cu + 2HF + F_2 \quad (4)$$

Based on the above results, it was revealed that it is possible to recover metal copper from an HF/$H_2O_2$ solution in which copper has been dissolved.

<Fifth Useful Metal Recovery Process and Eighth Useful Metal Recovery Process Preliminary Experiment 2 (Usage of Aluminum Wire)>

According to the preliminary experiment, aluminum wire was used in lieu of Si substrate fragments used for the preliminary experiment 1 mentioned above.

In the same manner as stated above, an HF solution with 20% HF concentration by weight resulting when pure water was added to an HF solution of semiconductor grade with 49% HF concentration by weight was prepared. Next, a 100 g $HF/H_2O_2$ mixed aqueous solution resulting when a 50 g hydrogen peroxide solution ($H_2O_2$) with 30% $H_2O_2$ concentration by weight was added to the 50 g HF solution mentioned above was prepared. 3 g of copper (Cu) powder of 99.85% purity was dissolved at 24° C. in the 100 g $HF/H_2O_2$ mixed aqueous solution and left for 24 hours. Aluminum wire of 1 mm in diameter was immersed in the $HF/H_2O_2$ mixed aqueous solution in which Cu had been dissolved at 24° C., in lieu of the Si substrates mentioned above. Metal copper was deposited on the surface of the aluminum wire immediately thereafter. As time passed, the diameter of the copper coated wire increased. After 24 hours, the diameter was about 3 mm. Additionally, the blue solution changed to become colorless.

<Main Experiment>

Next, the present invention was applied in actuality using wasted copper wiring print circuit boards, and copper (Cu) was recovered.

An HF solution with 20% HF concentration by weight resulting when pure water was added to an HF solution of semiconductor grade with 49% HF concentration by weight was prepared. A 100 g $HF/H_2O_2$ mixed aqueous solution resulting when a 50 g hydrogen peroxide solution ($H_2O_2$) with 30% $H_2O_2$ concentration by weight was added to the aforementioned 50 g HF solution was prepared. A piece of printed circuit boards with 2 cm² area was immersed in the aforementioned $HF/H_2O_2$ mixed aqueous solution at 24° C. and were left for 24 hours (fifth dissolution process or seventh dissolution process). At such time, the colorless $HF/H_2O_2$ mixed aqueous solution changed to become blue. Additionally, exterior changes could not be noted concerning portions other than copper wiring of the printed circuit boards and electronic components.

Next, a piece of printed circuit boards was removed from the $HF/H_2O_2$ mixed aqueous solution mentioned above. A piece of silicon (Si) substrates with 2 cm² area was immersed in the aforementioned mixed aqueous solution at 24° C., and a precipitation with a metallic luster started to form on the surface of Si substrate immediately thereafter. The same was left for 24 hours. The thickness of the precipitation increased, and the blue solution had changed to become colorless after 24 hours (fifth useful metal recovery process or eighth useful metal recovery process).

As a result of X-ray diffraction analysis of such precipitation substance, the X-ray diffraction chart shown in FIG. 23 was obtained. Diffraction peaks for the crystal face orientations of (111), (200), (220), (311), and (222) were obtained under conditions in which the diffraction angle 2θ was 43.3, 50.5, 74.2, 90.0, and 95.2 degrees, respectively. As a result, the obtained substance was revealed to be copper (Cu) crystals.

According the present embodiment, Si substrates are used as the substrates for causing precipitation of meal copper. However, it has been confirmed that even when aluminum (Al) plates, aluminum (Al) wire, and the like are used, metal copper can be deposited and recovered in the same manner as in the case of Si substrates.

Based on the results mentioned above, it was revealed that it is possible to recover copper metal from the wasted copper wiring printed circuit boards. In addition, according to the present embodiment, wasted copper wiring printed circuit boards were used. The present embodiment also can be applied to various forms of flat panel display wastes of liquid crystal display panels, organic EL (electroluminescence) panels, plasma displays, and the like, wastes using copper wiring of wasted integrated circuits and the like, and wastes of electronic devices and components thereof. Additionally, the same can also be applied to wiring materials using metal copper other than the aforementioned items. Examples include wastes such as harnesses for in-car copper wiring, power cables, electric wires for energy transmission and distribution, coaxial cables, twin-lead type feeders, and the like.

Additionally, according to the present embodiment, copper coated Al wires (Al wire core) were fabricated from the $HF/H_2O_2$ mixed aqueous solution in which Cu powder has been dissolved. The same applies to any items as long as they contain Cu, such as wasted printed circuit boards, in lieu of Cu powder in the same manner. The example can be also applied to wastes such as harnesses for in-car copper wiring, copper coated wires, coaxial cables, and the like.

As a method for recovery of useful metals (copper) of the present embodiment, a process in which wasted fluorescent tube glass is crushed and finely powered as needed may be used. Alternately, it is possible to conduct recovery of useful metals using filtrates removed via a method for recovery of useful metals as stated in the first, second, third or fourth embodiments.

Furthermore, according to the present embodiment, fragments of wasted printed circuit boards were used. However, cullet or that finely powdered by a mixer are also acceptable.

Moreover, according to the present embodiment, electric field was not applied for copper (Cu) precipitation. However, it is also possible conduct recycling via electrolysis.

Sixth Embodiment

Recovery of Silver

The present embodiment mainly relates to claims 2 and 9, and describes a method for recovery of silver (Ag) from plasma display panels and wasted copper wiring printed boards using lead-free solders.

<Eighth Useful Metal Recovery Process Preliminary Experiment>

As stated regarding the recovery of Pb and Sn from Pb—Sn—Zn solder in the fourth embodiment, a 120 g $HF/H_2O_2$ mixed aqueous solution resulting when an HF solution of 49% HF concentration by weight and a 20 g $H_2O_2$ aqueous solution with 30% $H_2O_2$ concentration by weight were mixed was prepared. A 100 g $HF/H_2O_2$ mixed aqueous solution was used. And 10 g of Sn—Cu—Ag solder (components: Sn: 96.5% by weight; Ag: 3% by weight; and Cu: 0.5% by weight) were dissolved therein (fifth dissolution process or seventh dissolution process). Thereupon, it was possible to obtain tin as the sediment of oxide and fluoride.

Next, the aforementioned sediment was filtered, and the Si substrate was immersed in a solution obtained as a result of removing the filtered substances. Cu was deposited and recovered (fifth useful metal recovery process or seventh useful metal recovery process). And based on the equipment configuration shown in FIG. 5, electrolysis was conducted for 4 hours at solution temperature of 24° C. under conditions of an applied DC voltage of 2.5 V and an average current of 320 mA (eighth useful metal recovery process). Platinum (Pt)

plates were used for electrodes. Precipitation of a substance of 0.29 g with a silver color by weight was obtained on the cathode-side platinum electrode. Based on X-ray diffraction analysis, X-ray diffraction chart shown in FIG. 24 were obtained. Diffraction peaks for the crystal face orientations of (111), (200), (220), and (311) were obtained under conditions in which the diffraction angle 2θ was 38.05, 44.25, 64.50, and 77.55 degrees, respectively. As a result, the obtained substance was revealed to be silver (Ag) crystals. It was possible to recover 0.3 g of Ag at maximum from this Ag concentration contained in lead-free solder. The main test resulted in a rate of recovery of about 97%.

Based on the results mentioned above, it was revealed that it is possible to recover and separate silver (Ag) from wasted copper wiring printed circuit boards using lead-free solder in the same manner as stated in the fourth embodiment.

<Second Useful Metal Recovery Process Preliminary Experiment>

First, the wasted plasma display panels were broken down. Following crushing of such glass substrates, powderization using a mixer took place (first powderization process or crushing process and second powderization process).

Next, the aforementioned powders were dissolved in an HF solution of semiconductor grade with 49% HF concentration by weight and insoluble sediment was obtained (first dissolution process). Following the separation of such insoluble sediment from the solution by filtration (first filtration process), the filtrate was dissolved in pure water, which resulted in an electrolytic solution (second dissolution process). Next, as stated in the first embodiment, based on the equipment configuration shown in FIG. 5, electrolysis was conducted and indium was deposited and recovered. Following this process, electrolysis was conducted by increasing the voltage of the redox potential difference between Ag and In (1.1371 V) or higher. Thereby, it is possible to deposit and recover silver (Ag) (second useful metal recovery process).

As stated in the first embodiment through the sixth embodiment mentioned above, upon electrolysis, platinum electrodes were used. However, carbon electrodes or other electrodes, or film electrodes such as platinum and carbon formed on the glass substrates may be used.

EXPLANATION OF REFERENCES

Figure 1:
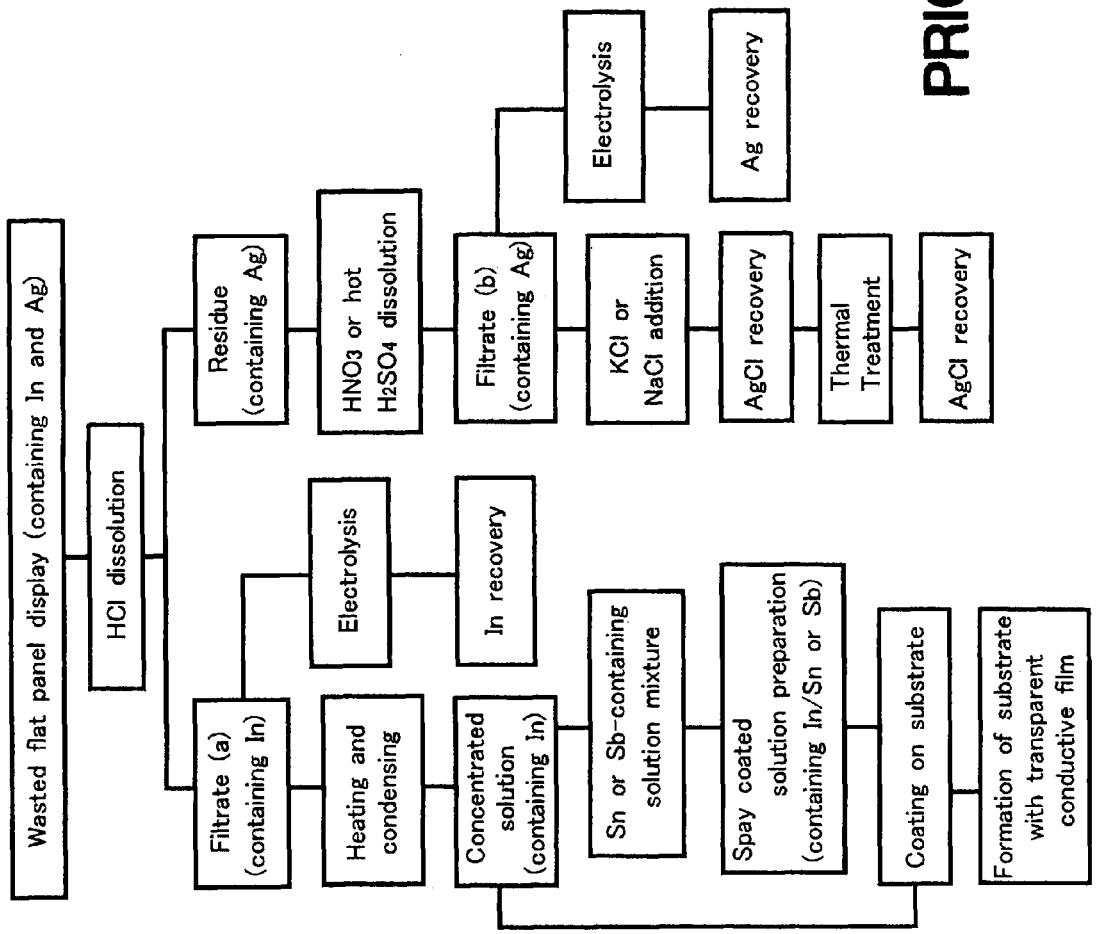
FIG. 1 is an exemplary flowchart showing a conventional method of recycling useful metals.
Figure 2:
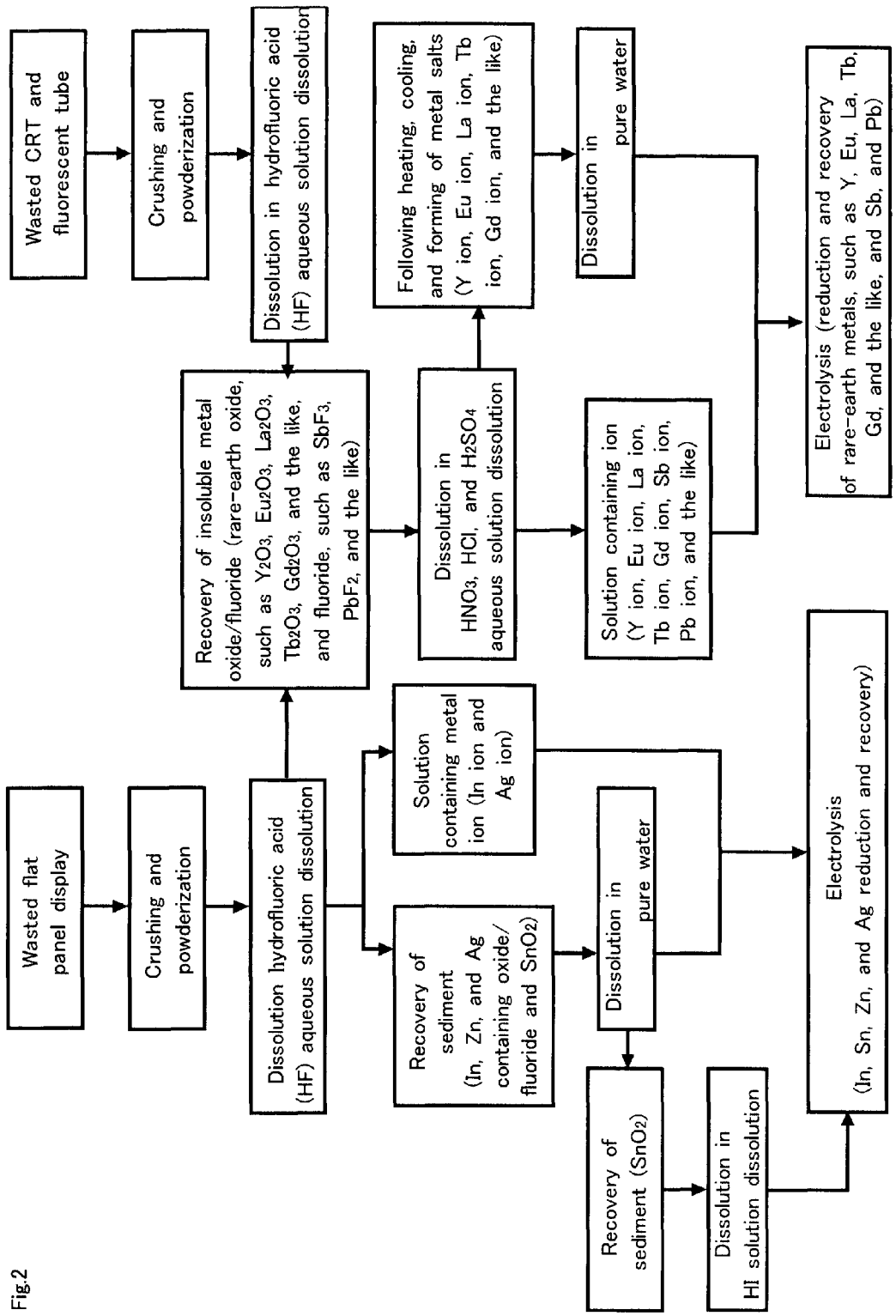
FIG. 2 is an exemplary flowchart showing a method of recycling useful metals of the present invention.
Figure 3:
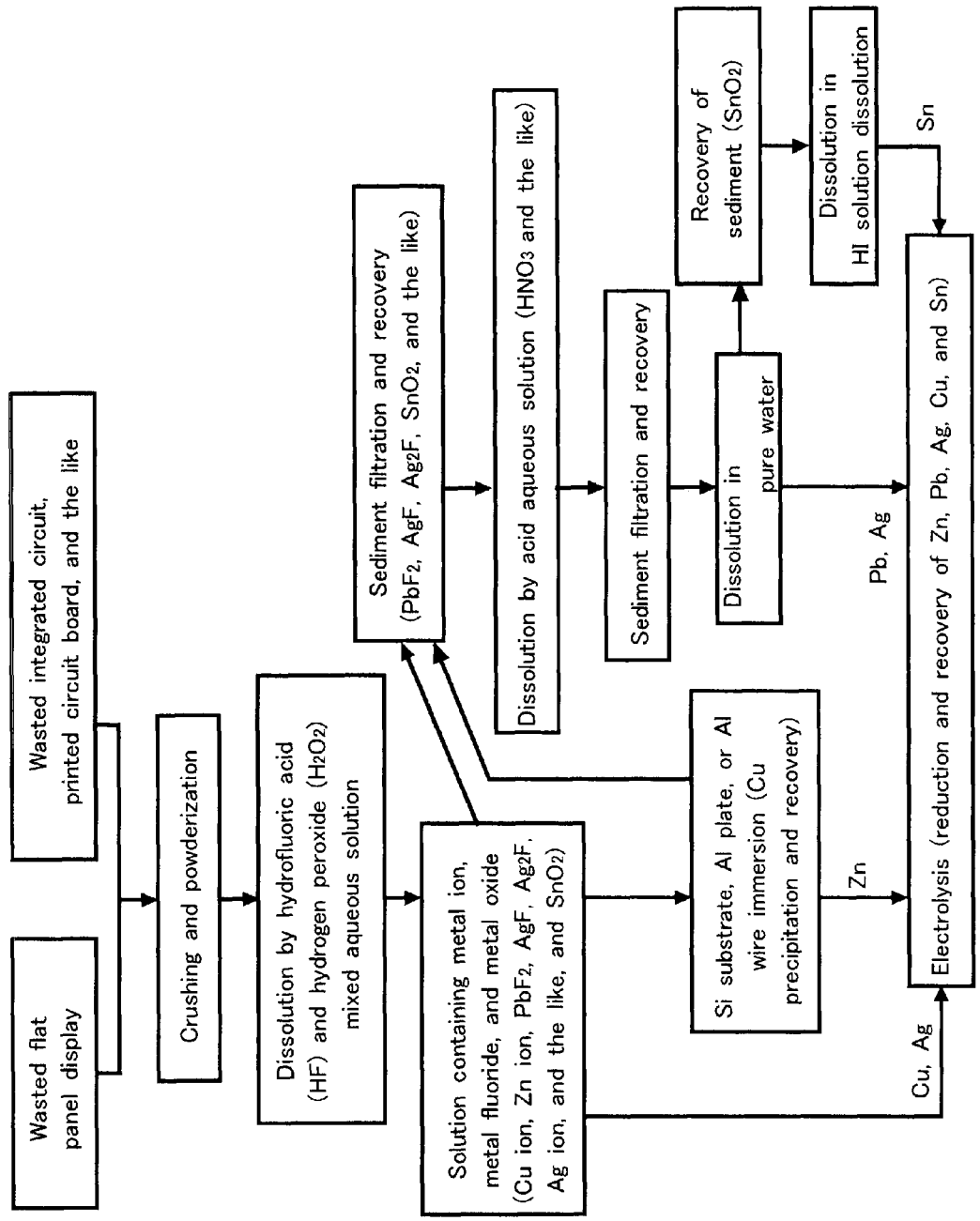
FIG. 3 is another exemplary flowchart showing a method of recycling useful metals of the present invention.
Figure 4:
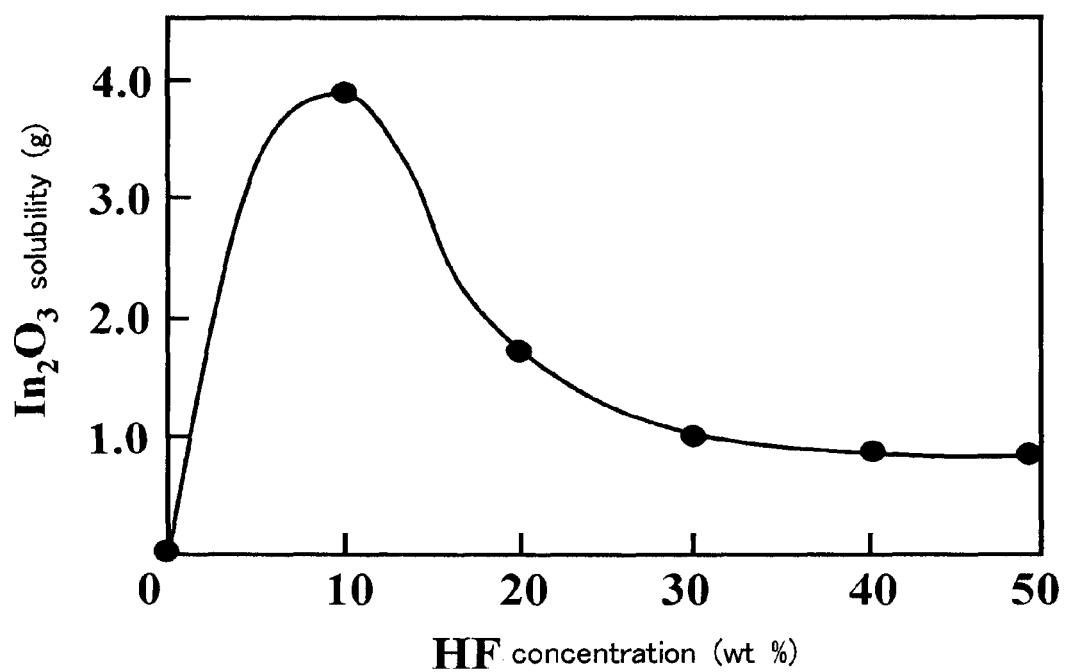
FIG. 4 shows HF concentration dependence of the degree of solubility when indium oxide ($In_2O_3$) power has been dissolved in an HF solution as an example of the embodiment of the present invention.
Figure 5:
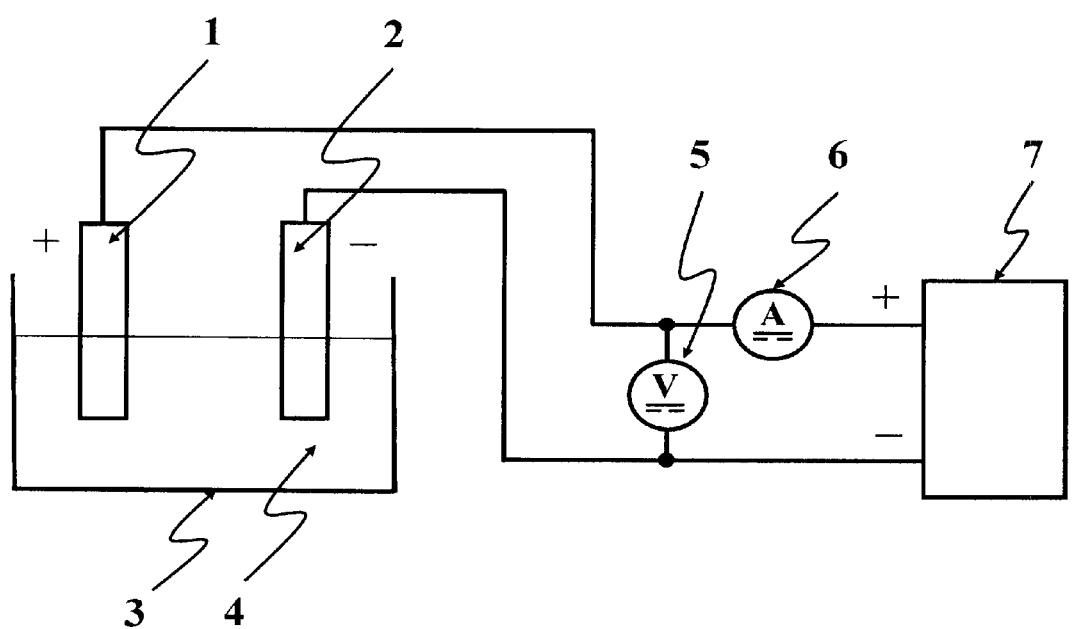
FIG. 5 shows an equipment configuration used for electrolysis of an embodiment of the present invention.
Figure 6:
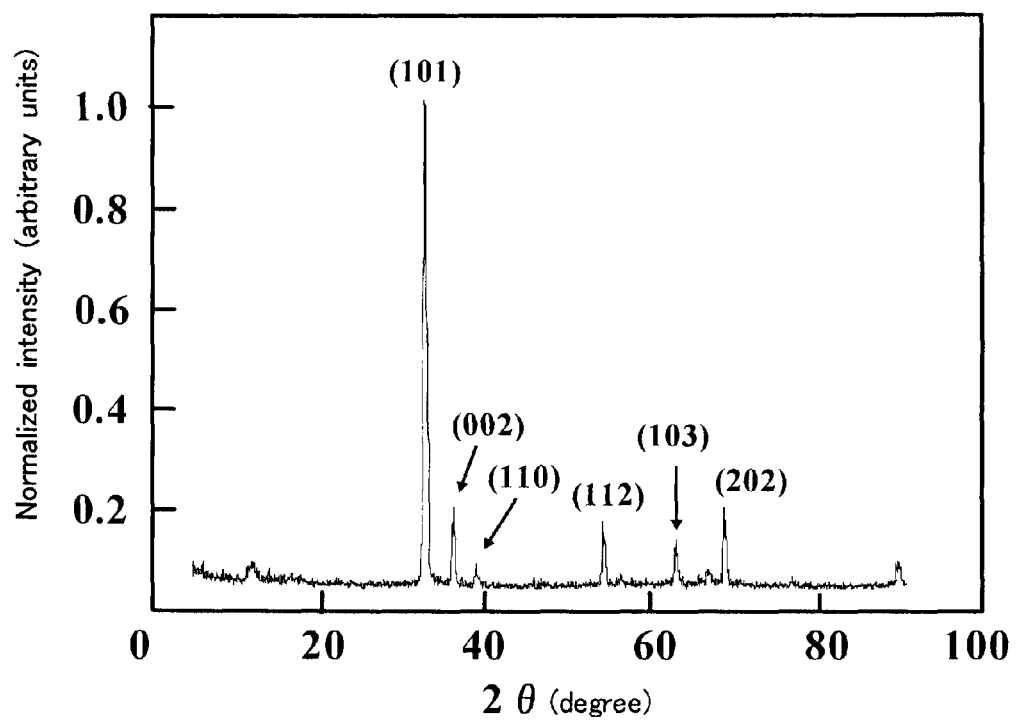
FIG. 6 is X-ray diffraction chart 1 of In recycled as an example of an embodiment of the present invention.
Figure 7:
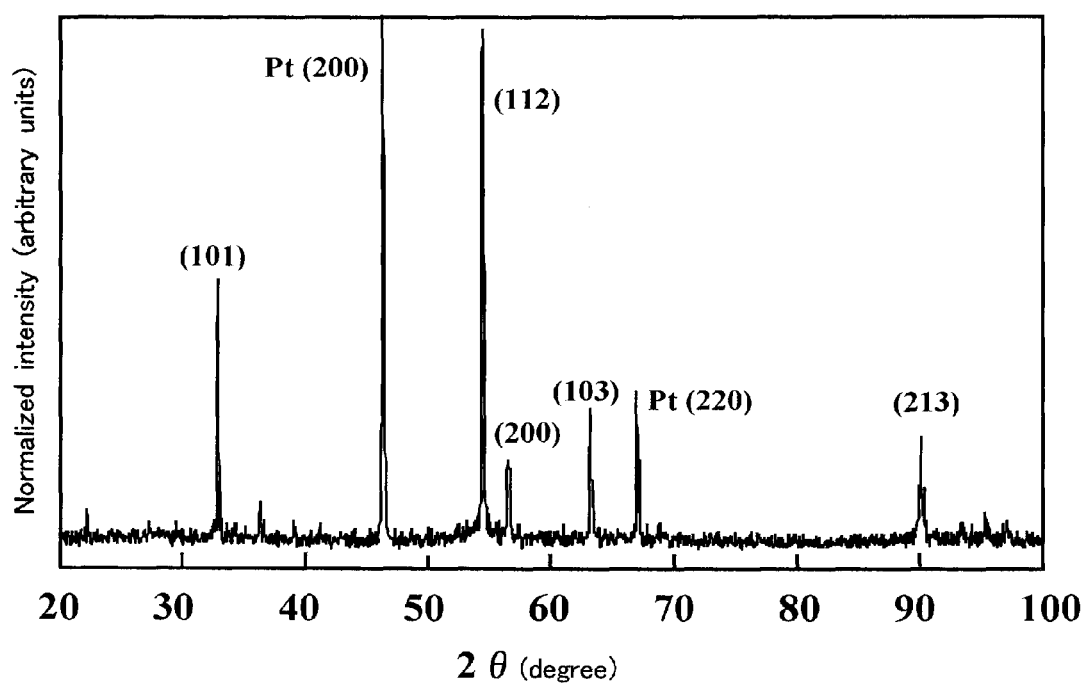
FIG. 7 is X-ray diffraction chart 2 of In recycled as an example of an embodiment of the present invention.
Figure 8:
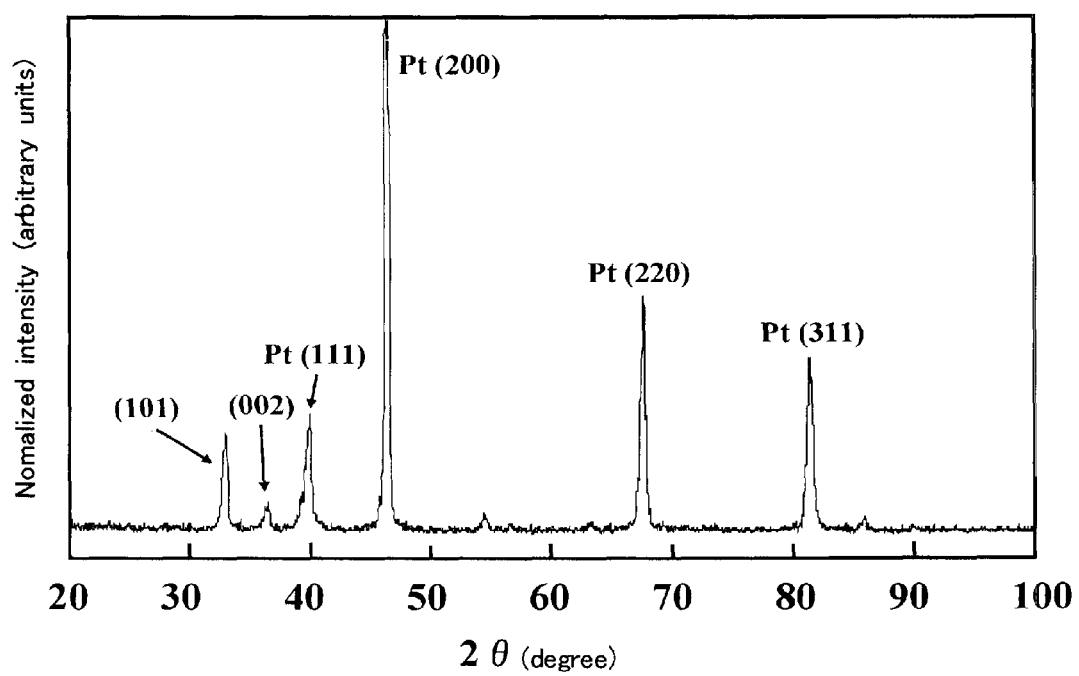
FIG. 8 is X-ray diffraction chart 3 of In recycled as an example of an embodiment of the present invention.
Figure 9:
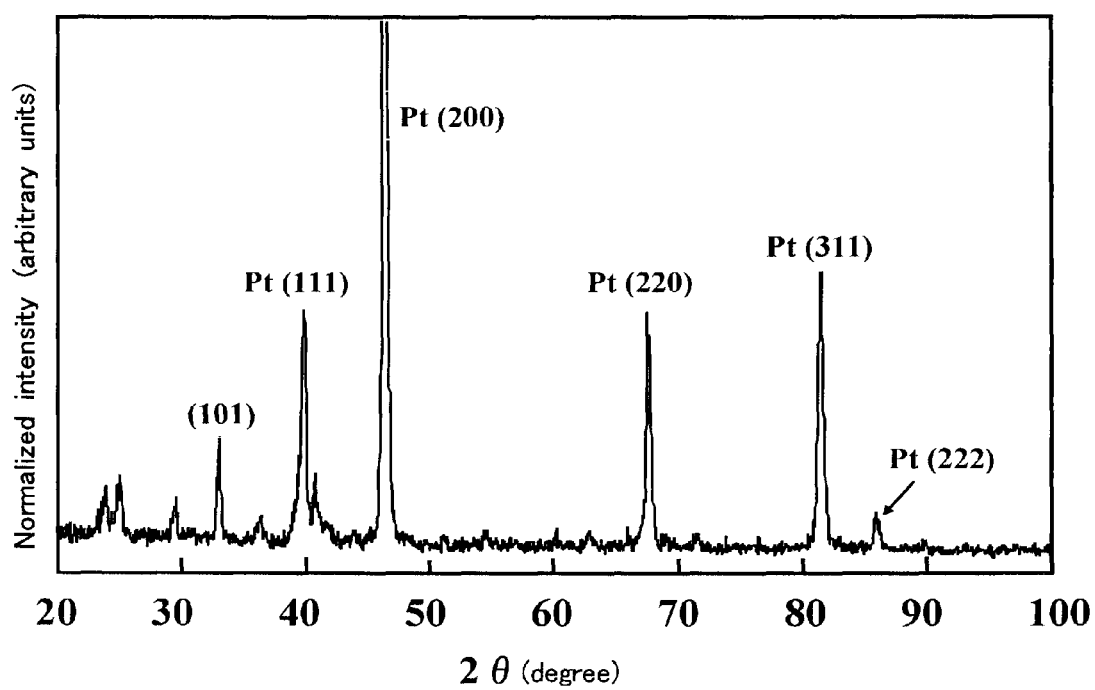
FIG. 9 is X-ray diffraction chart of In recycled from glass substrates of liquid crystal display panels as an example of an embodiment of the present invention.
Figure 10:
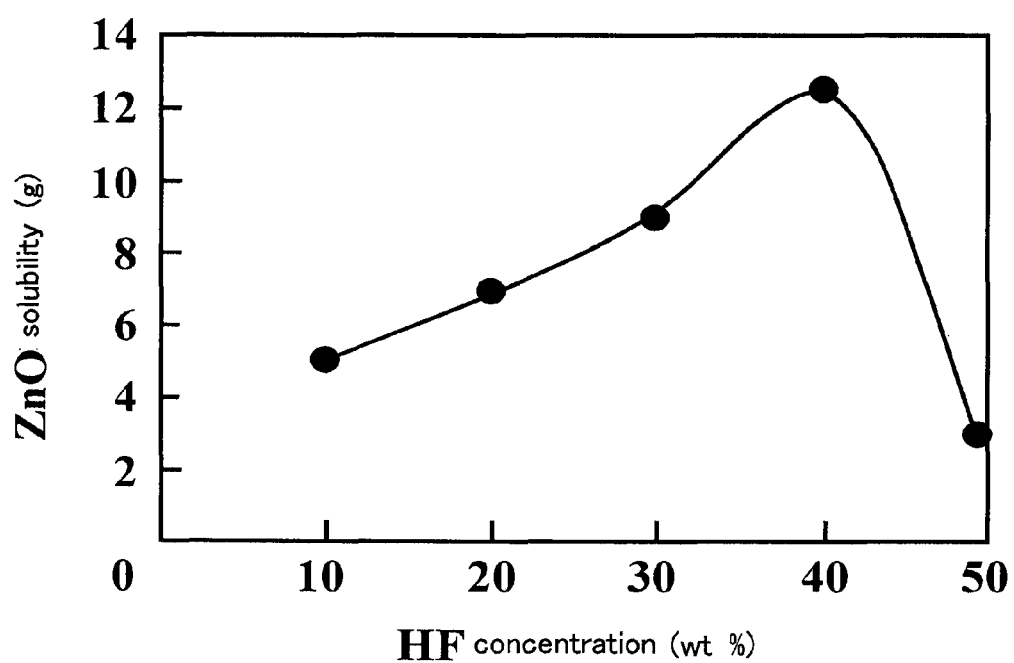
FIG. 10 shows the HF concentration dependence of the degree of solubility when zinc oxide (ZnO) power was dissolved in an HF solution as an example of an embodiment of the present invention.
Figure 11:
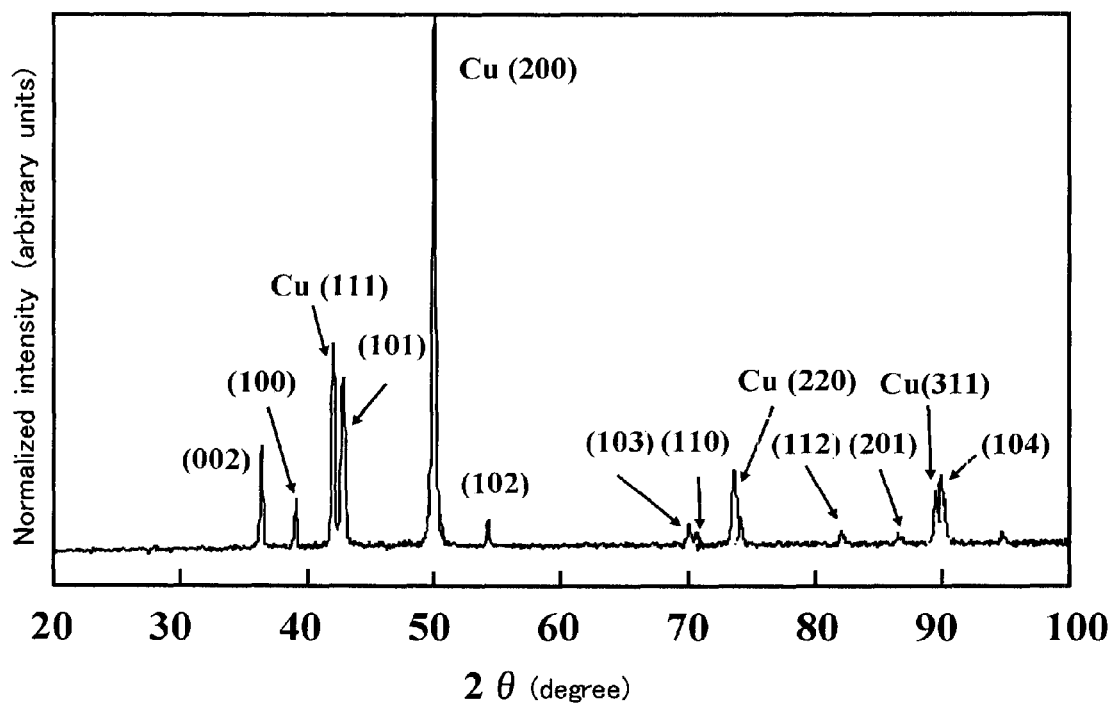
FIG. 11 is X-ray diffraction chart 1 of Zn recycled as an example of an embodiment of the present invention.
Figure 12:
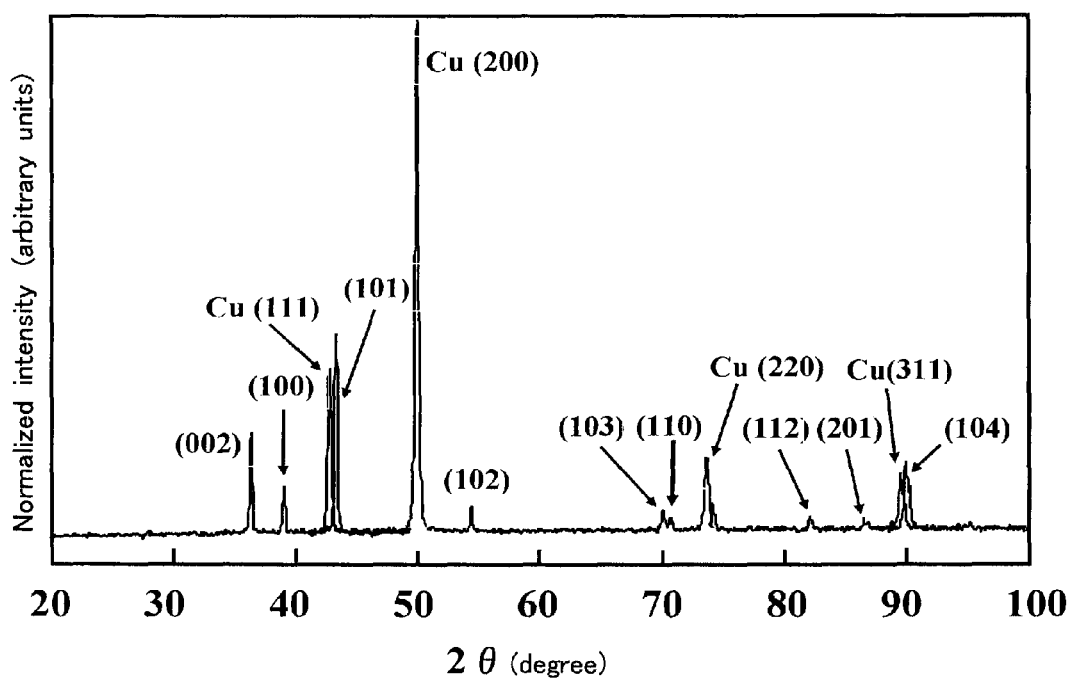
FIG. 12 is X-ray diffraction chart 2 of Zn recycled as an example of an embodiment of the present invention.
Figure 13:
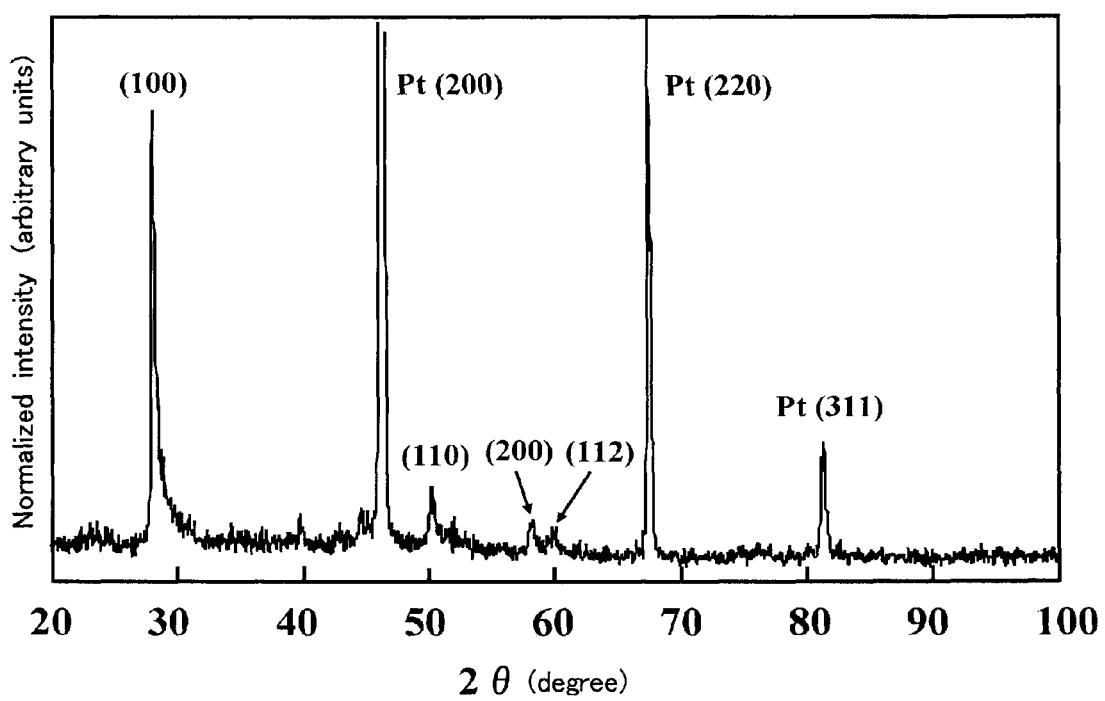
FIG. 13 is X-ray diffraction chart of Y recycled as an example of an embodiment of the present invention.
Figure 14:
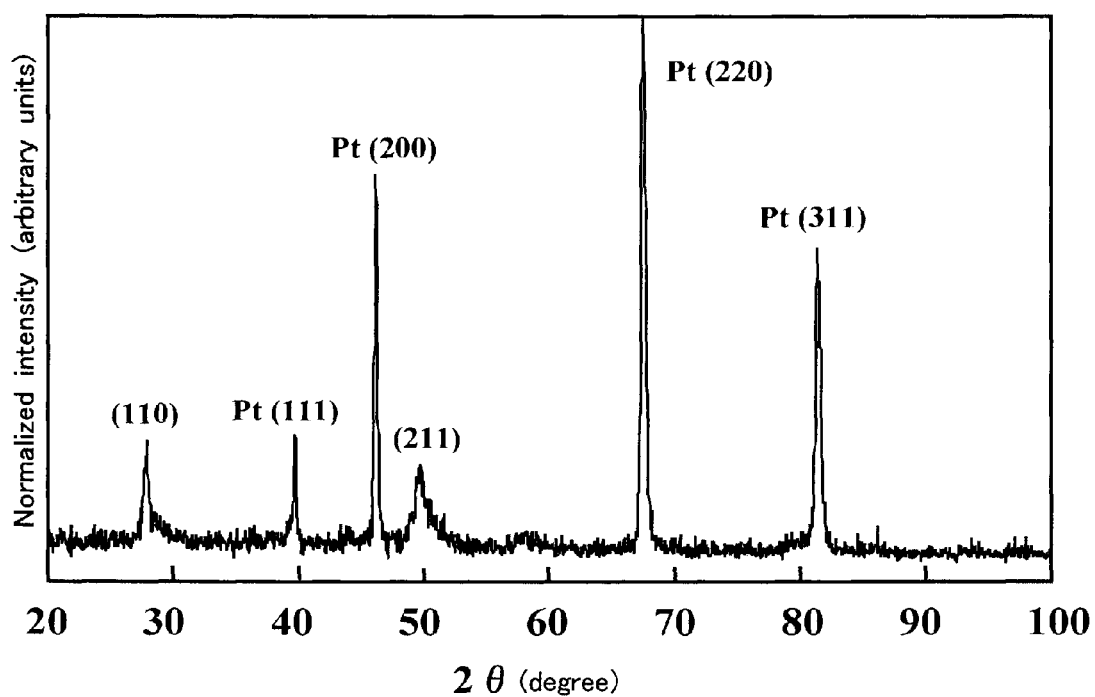
FIG. 14 is X-ray diffraction chart of Eu recycled as an example of an embodiment of the present invention.
Figure 15:
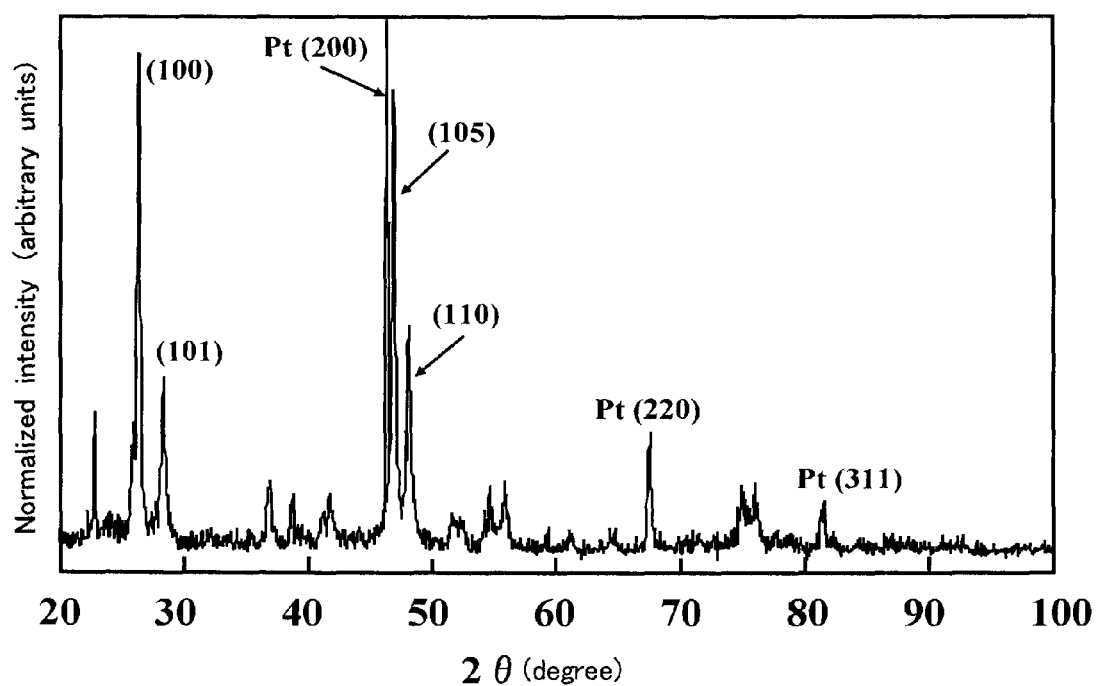
FIG. 15 is X-ray diffraction chart of La recycled as an example of an embodiment of the present invention.
Figure 16:
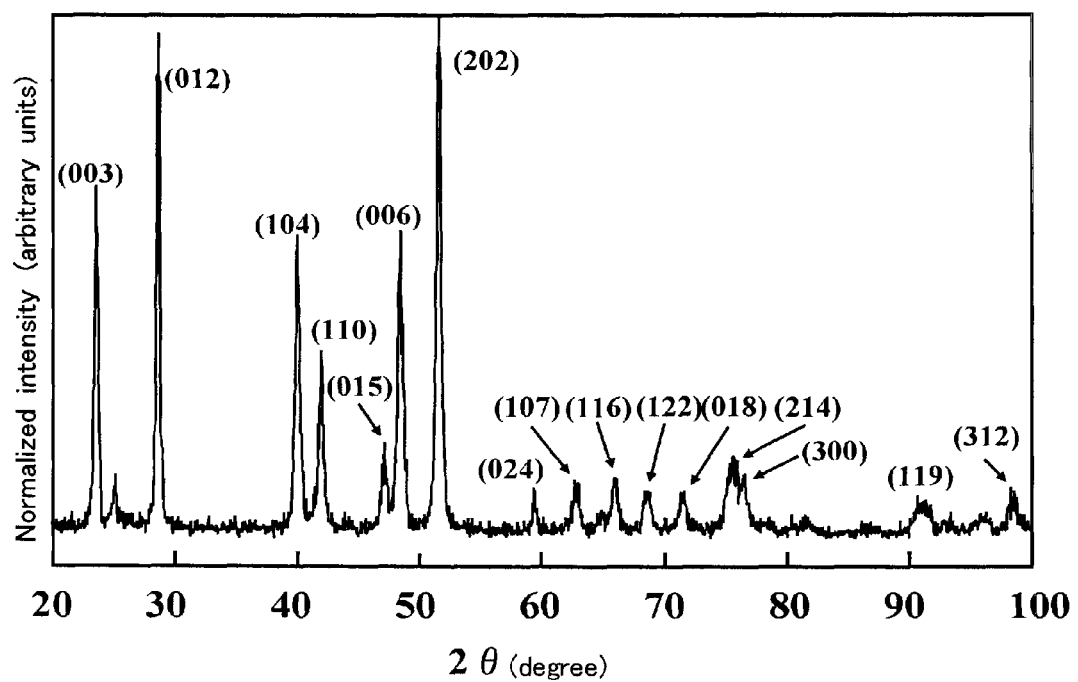
FIG. 16 is X-ray diffraction chart 1 of Sb recycled as an example of an embodiment of the present invention.
Figure 17:
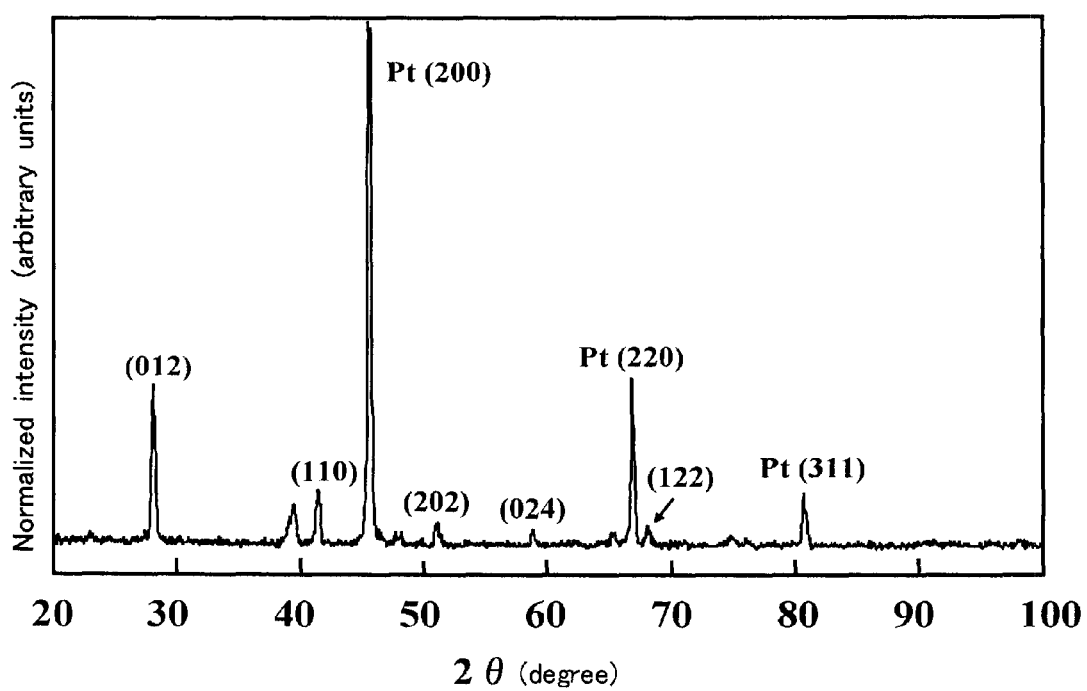
FIG. 17 is X-ray diffraction chart 2 of Sb recycled as an example of an embodiment of the present invention.
Figure 18:
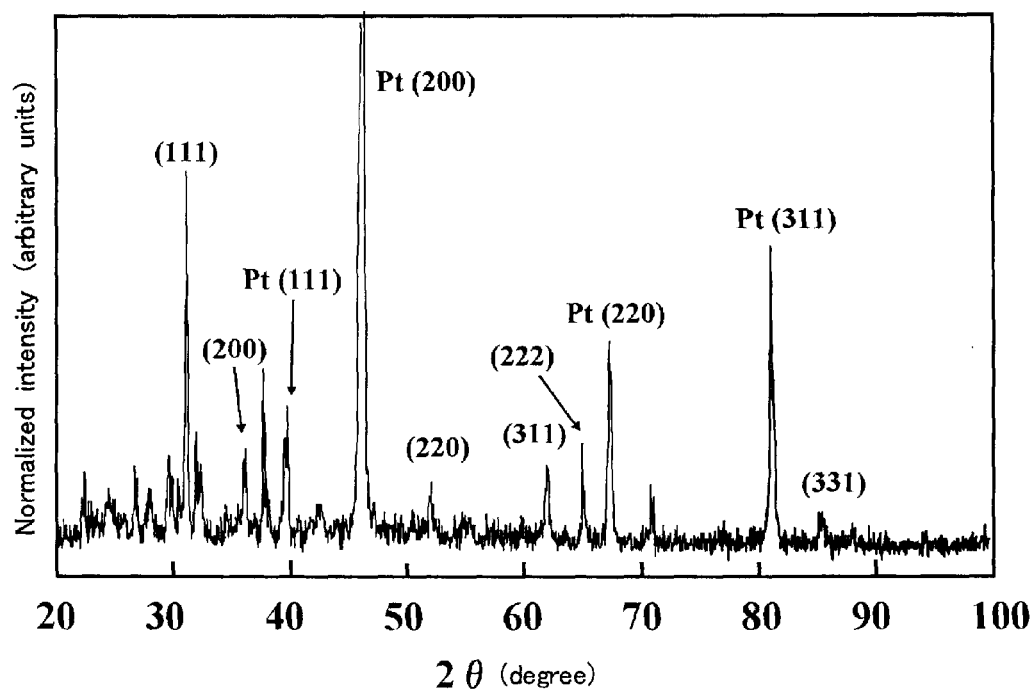
FIG. 18 is X-ray diffraction chart 1 of Pb recycled as an example of an embodiment of the present invention.
Figure 19:
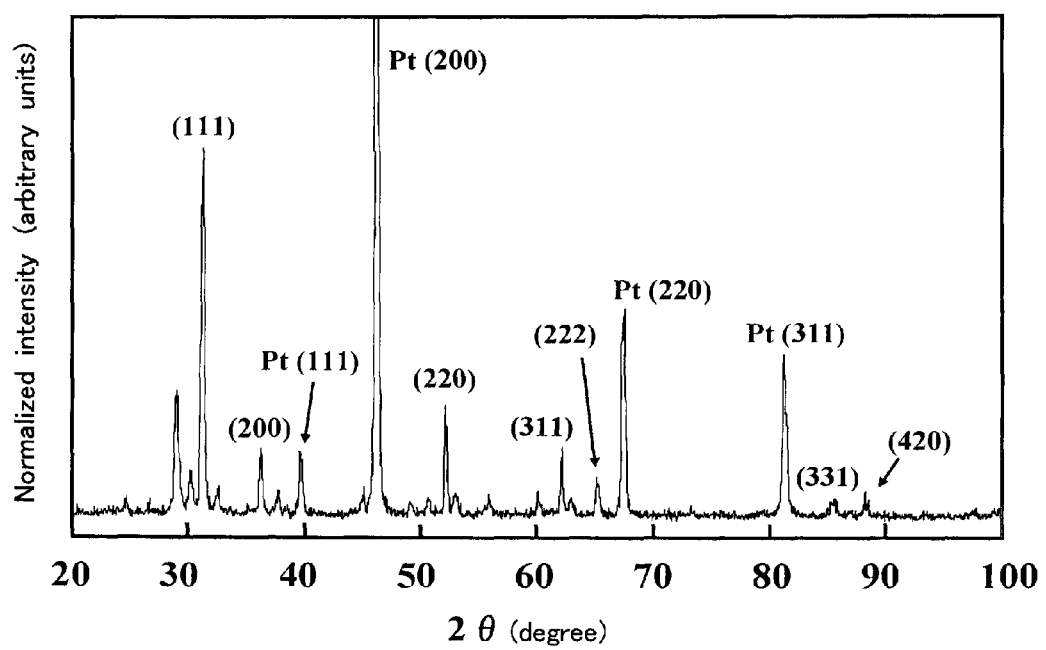
FIG. 19 is X-ray diffraction chart 2 of Pb recycled as an example of an embodiment of the present invention.
Figure 20:
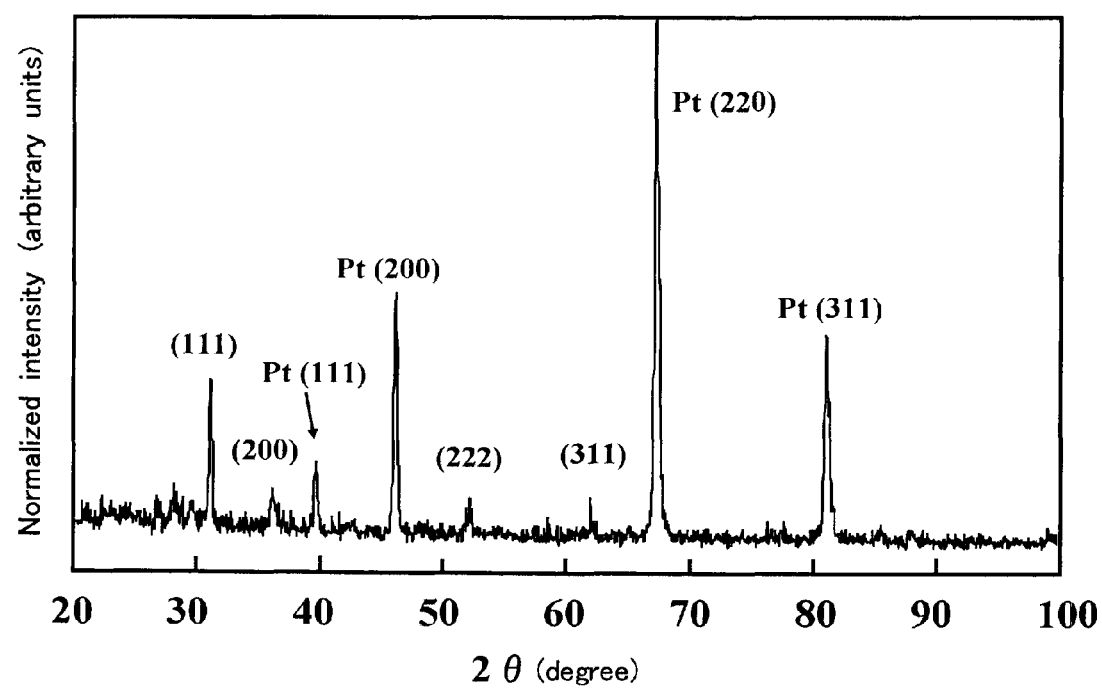
FIG. 20 is X-ray diffraction chart of Pb recycled from lead-containing solder as an example of an embodiment of the present invention.
Figure 21:
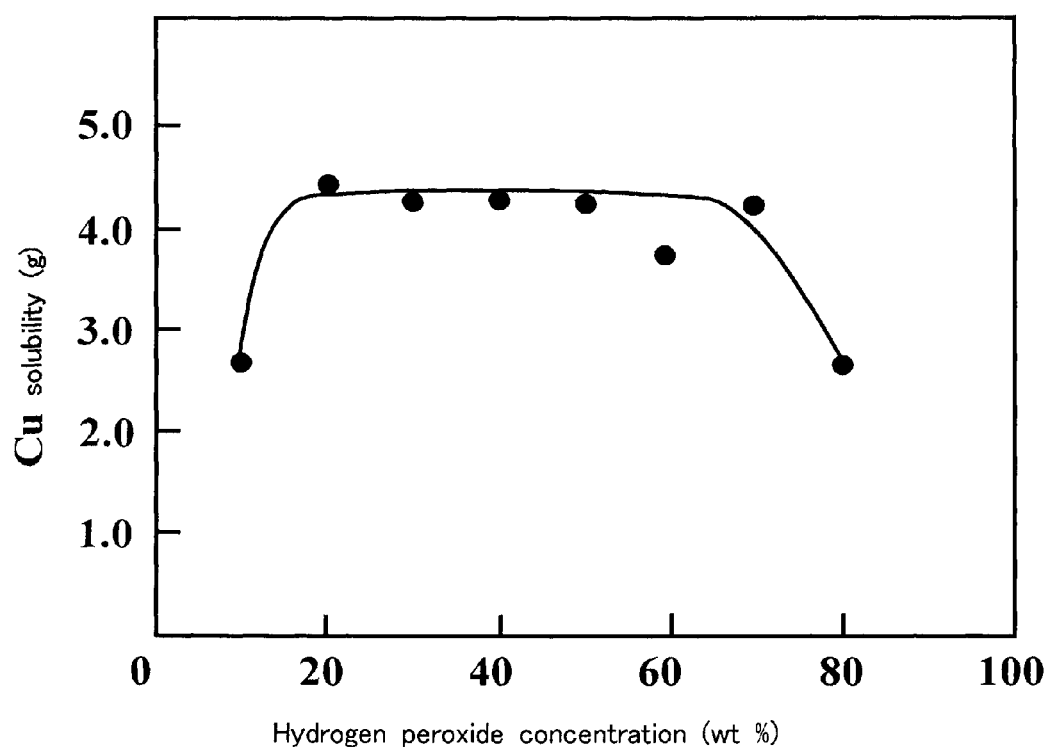
FIG. 21 shows hydrogen peroxide ($H_2O_2$) concentration dependence of the degree of solubility when copper power was dissolved in an $HF/H_2O_2$ solution as an example of an embodiment of the present invention.
Figure 22:
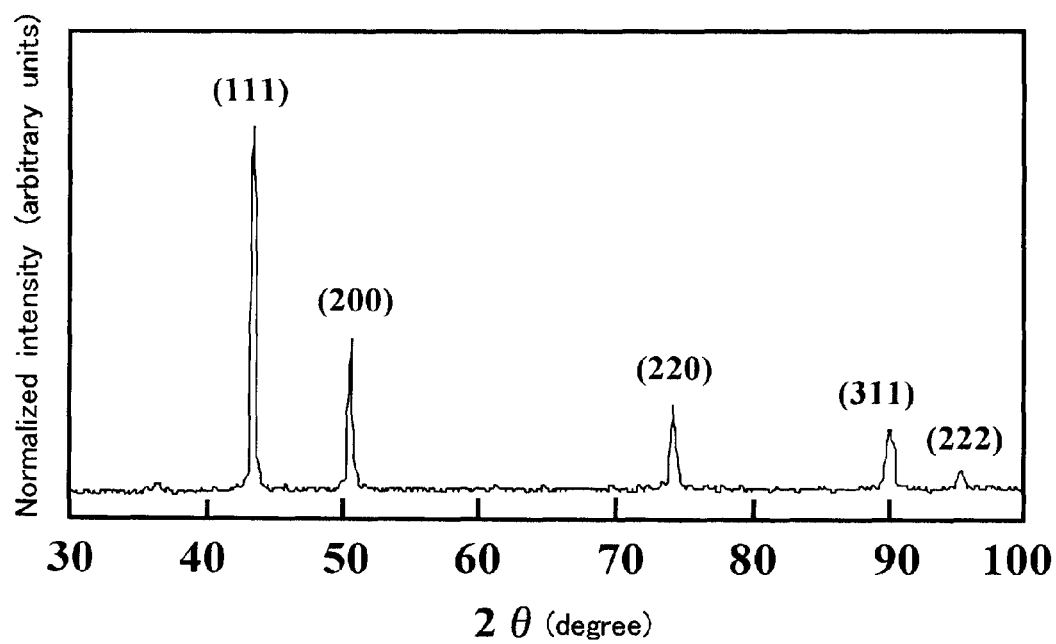
FIG. 22 is X-ray diffraction chart 1 of Cu recycled as an example of an embodiment of the present invention.
Figure 23:
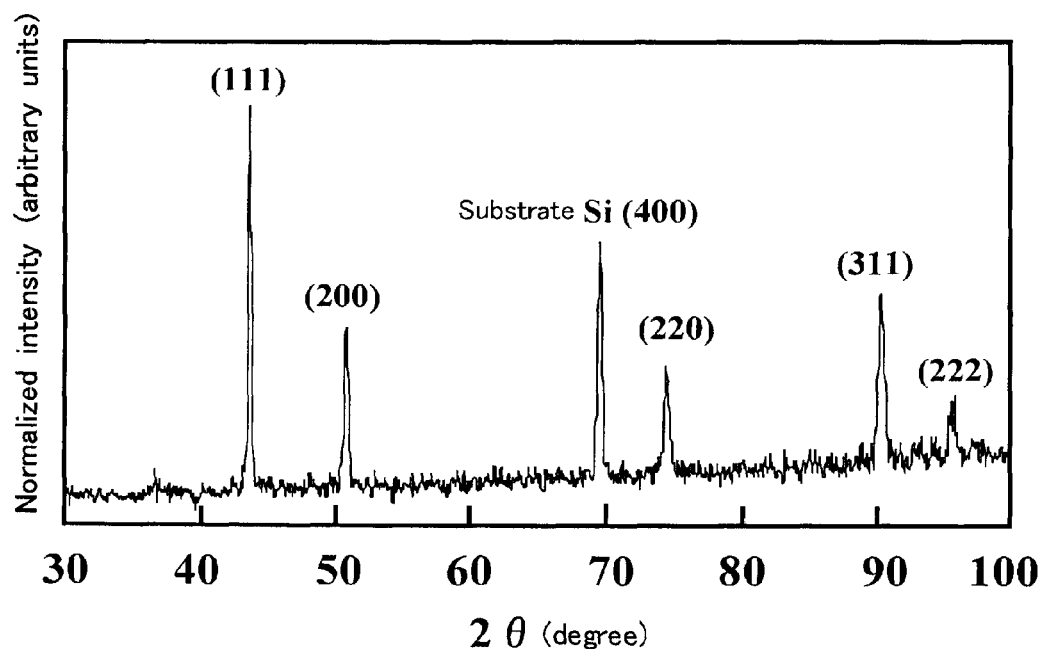
FIG. 23 is X-ray diffraction chart 2 of Cu recycled as an example of an embodiment of the present invention.
Figure 24:
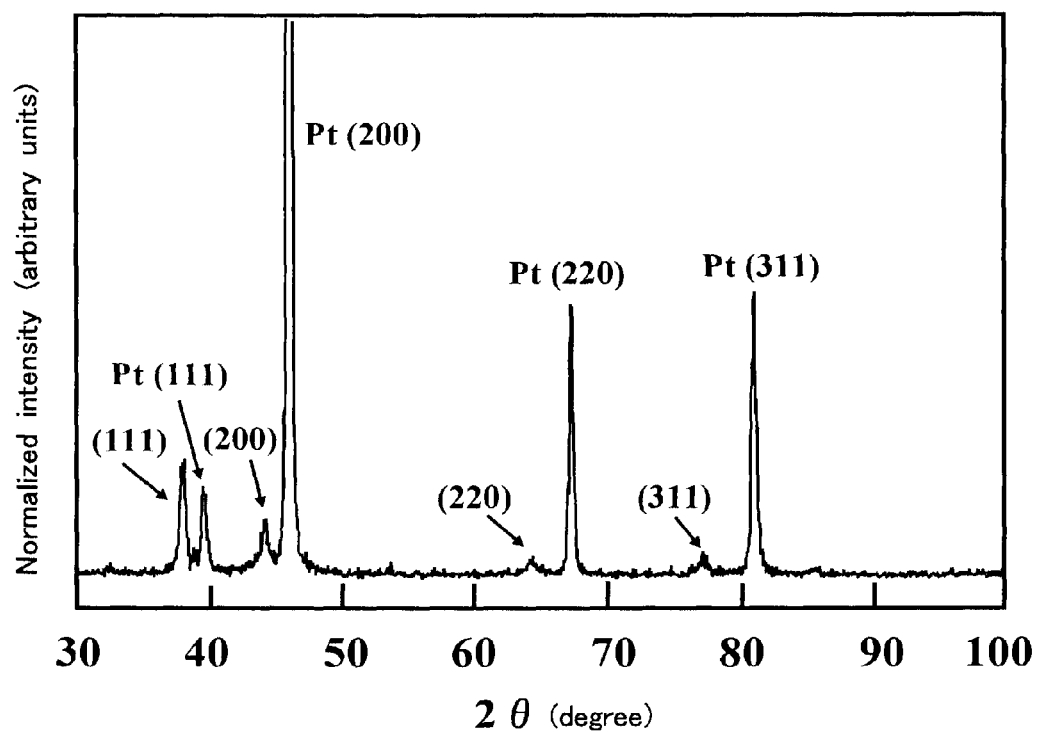
FIG. 24 is X-ray diffraction chart of Ag recycled as an example of an embodiment of the present invention.
Figure 25:
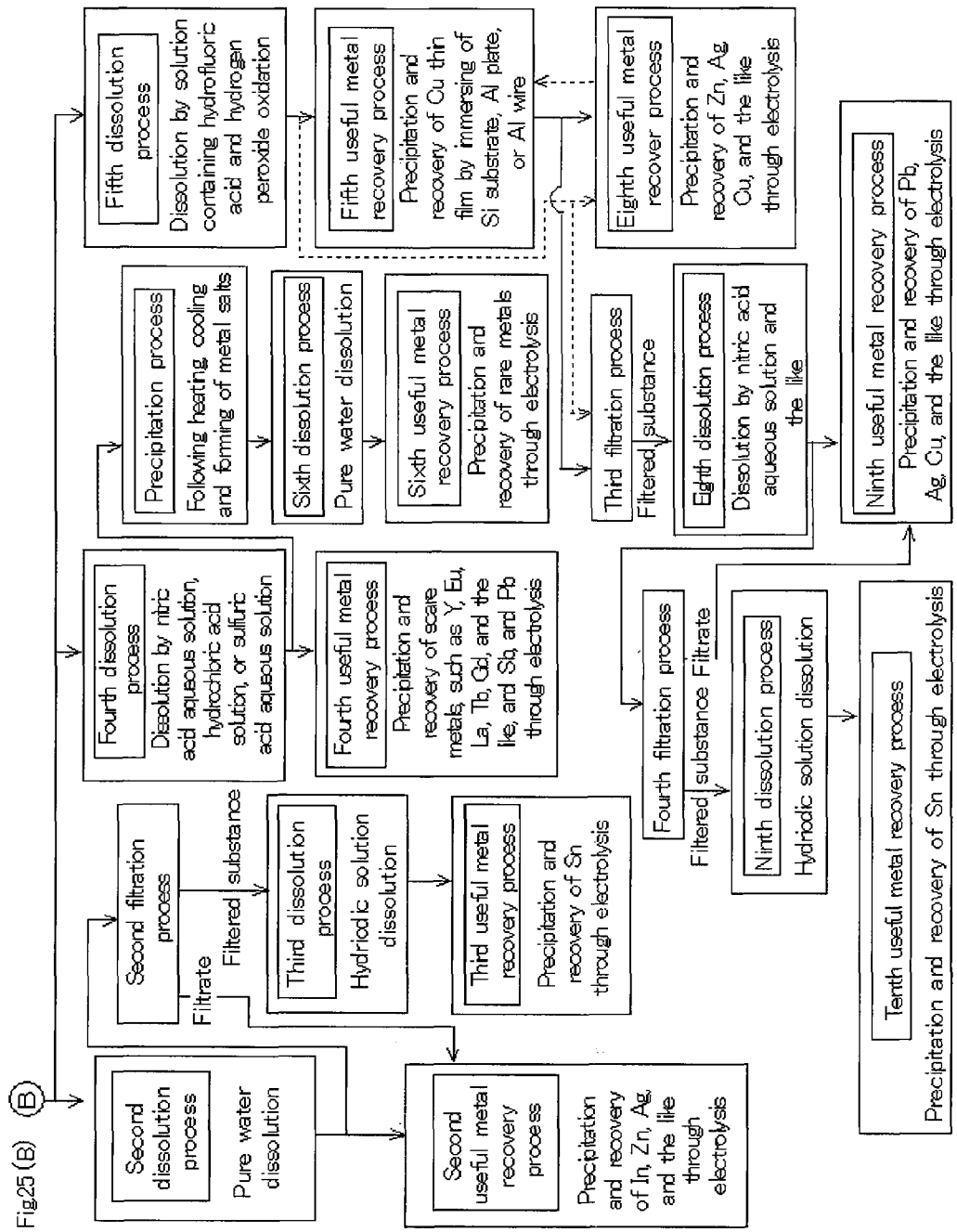
FIG. 25A is exemplary flowchart 3 showing a conventional method of recycling useful metals of the present invention.
FIG. 25B is exemplary flowchart 4 showing a method of recycling useful metals of the present invention.
Figure 26:
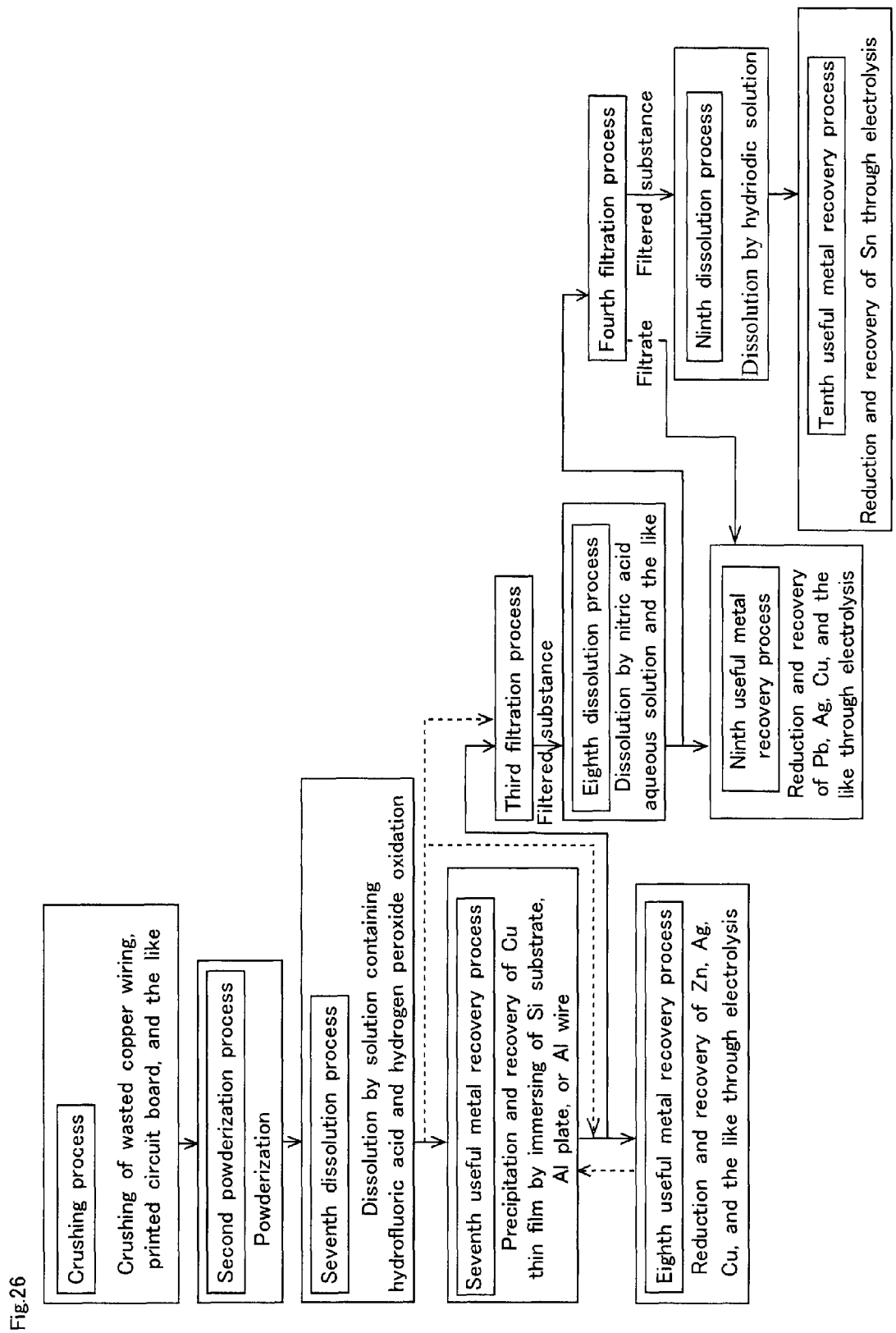
FIG. 26 is exemplary flowchart 5 showing a method of recycling useful metals of the present invention.

| | |
|---|---|
| 1: | Anode |
| 2: | Cathode |
| 3: | Teflon (registered trademark) vessel |
| 4: | Treated solution |
| 5: | DC voltmeter |
| 6: | DC ammeter |
| 7: | Stabilized DC power supply |

What is claimed is:
1. A method of recycling useful metals, comprising:
a first powderization process
wherein one or more of various forms of flat panel display waste of liquid crystal display panels, organic EL (electroluminescence) panels, and plasma displays, wasted cathode ray tubes, wasted fluorescent tubes, or wasted solar panels is crushed simultaneously and finely powdered;
a first dissolution process
wherein the powdered materials are dissolved at least until a glass is completely dissolved by a hydrofluoric acid solution;

a first filtration process
  wherein the solution is filtered and various insoluble metal oxides, various metal fluorides, and various metals are removed; and
a first useful metal recovery process
  wherein a filtrate obtained in the first filtration process is electrolyzed, and various first useful metals are deposited and recovered.

2. The method for recycling useful metals of claim 1, comprising
a second dissolution process,
  which causes an insoluble sediment contained in filtered substances removed through the first filtration process to be dissolved in pure water and further comprising
a second useful metal recovery process,
  which causes various second useful metals to be deposited and recovered based on electrolysis of a solution generated through the second dissolution process.

3. The method for recycling useful metals of claim 2, wherein the first useful metals and the second useful metals are indium, zinc, and silver.

4. The method for recycling useful metals of claim 1, comprising:
a second dissolution process,
  which causes an insoluble sediment contained in filtered substances removed through the first filtration process to be dissolved in pure water;
a second filtration process,
  which filters the solution generated through the second dissolution process and removes insoluble sediment;
a third dissolution process,
  which causes insoluble sediment contained in the filtered substances removed from the second filtration process to be dissolved in hydroiodic solution; and
a third useful metal recovery process,
  which causes various third useful metals to be deposited and recovered based on electrolysis of the solution generated through the third dissolution process.

5. The method for recycling useful metals of claim 4, wherein the third useful metal is tin.

6. The method for recycling useful metals of claim 1, comprising
a fourth dissolution process
  wherein the insoluble various metal oxides and various metal fluorides contained in filtered substances that have been removed from the first filtration process are dissolved in one or more solutions selected from the group consisting of a nitric acid aqueous solution, a hydrochloric acid solution, and a sulfuric acid aqueous solution and
a fourth useful metal recovery process,
  which causes various fourth useful metals to be deposited and recovered based on electrolysis of the solution generated through the fourth dissolution process.

7. The method for recycling useful metals of claim 1, comprising
a fifth dissolution process
  that causes copper contained in filtered substances removed from the first filtration process to be dissolved in a solution containing hydrofluoric acid and hydrogen peroxide and
a fifth useful metal recovery process
  wherein silicon substrates, aluminum plates, and aluminum wires are immersed in the solution of the fifth dissolution process and fifth useful metals are deposited and recovered.

8. The method for recycling useful metals of claim 7, wherein the fifth useful metals are copper.

9. The method for recycling useful metals of claim 1, wherein the first useful metals are indium, zinc, and silver.

10. A method for recycling useful metals, comprising:
a first powderization process
  wherein one or more of various forms of flat panel display waste of liquid crystal display panels, organic EL (electroluminescence) panels, and plasma displays, wasted cathode ray tubes, or wasted fluorescent tubes is crushed simultaneously and finely powdered;
a first dissolution process
  wherein the powdered materials are dissolved at least until a glass is completely dissolved by a hydrofluoric acid solution;
a first filtration process
  wherein the solution is filtered and insoluble various metal oxides, various metal fluorides, and various metals are removed;
a fourth dissolution process
  wherein the insoluble various metal oxides, various metal fluorides, and various metals removed from the first filtration process are dissolved in one or more solutions selected from the group consisting of a nitric acid aqueous solution, an hydrochloric acid solution, and a sulfuric acid aqueous solution; and
a fourth useful metal recovery process,
  which causes various fourth useful metals to be deposited and recovered based on electrolysis of the solution generated through the fourth dissolution process.

11. The method for recycling useful metals of claim 6 or 10, comprising:
a precipitation process,
  which heats the solution generated through the fourth dissolution process and, following cooling, deposits metal salts;
a sixth dissolution process,
  which causes the metal salts to be dissolved in pure water; and
a sixth useful metal recovery process,
  which causes various sixth useful metals to be deposited and recovered based on electrolysis of the solution generated through the sixth dissolution process.

12. The method for recycling useful metals of claim 11, wherein the sixth useful metals are rare earth metals.

13. The method for recycling useful metals of claim 6 or 10, wherein the fourth useful metals are rare earth metals, antimony and lead.

14. A method of recycling useful metals, comprising:
a crushing process
  wherein one or more of various forms of flat panel display waste of liquid crystal display panels, organic EL (electroluminescence) panels, plasma displays, wasted integrated circuits, wasted printed circuit boards, harnesses for in-car copper wiring, power cables, electric wires for energy transmission and distribution, coaxial cables, twin-lead type feeders, and copper wiring is crushed simultaneously and finely powdered;
a second powderization process,
  which causes powderization as needed;
a seventh dissolution process,
  which causes the powder to be dissolved in a solution containing hydrofluoric acid and hydrogen peroxide; and
a seventh useful metal recovery process wherein silicon substrates, aluminum plates, and aluminum wires are immersed in the solution of the seventh dissolution process and seventh useful metals are deposited and recovered.

15. The method for recycling useful metals of claim 7 or 14, further comprising
an eighth useful metal recovery process,
which deposits and recovers ionized metals through electrolysis prior to or following the fifth useful metal recovery process or the seventh useful metal recovery process.

16. The method for recycling useful metals of claim 15, wherein the eighth useful metals are zinc, silver, and copper.

17. The method for recycling useful metals of claim 7 or 14, comprising:
a third filtration process,
which filters the solution generated through the fifth dissolution process or the seventh dissolution process prior to or following the fifth useful metal recovery process or the seventh useful metal recovery process and removes insoluble sediment:
an eighth dissolution process,
wherein the sediment obtained through the third filtration process is dissolved in acid aqueous solution; and
a ninth useful metal recovery process,
which deposits and recovers ionized metals through electrolysis of the solution generated through the eighth dissolution process.

18. The method for recycling useful metals of claim 17, comprising:
a fourth filtration process,
which filters the solution generated through the eighth dissolution process and removes insoluble sediment:
a ninth dissolution process,
wherein the sediment obtained through the fourth filtration process is dissolved in a hydroiodic acid solution; and
a tenth useful metal recovery process,
which deposits and recovers various tenth useful metals based on electrolysis of the solution generated through the ninth dissolution process.

19. The method for recycling useful metals of claim 18, wherein the tenth useful metal is tin.

20. The method for recycling useful metals of claim 17, wherein the ninth useful metals are lead, silver, and copper.

21. The method for recycling useful metals of claim 14, wherein the seventh useful metals are copper.

* * * * *

UNITED STATES PATENT AND TRADEMARK OFFICE
CERTIFICATE OF CORRECTION

PATENT NO. : 8,317,896 B2
APPLICATION NO. : 12/812154
DATED : November 27, 2012
INVENTOR(S) : Tetsuya Homma et al.

It is certified that error appears in the above-identified patent and that said Letters Patent is hereby corrected as shown below:

In column 12, after line 56 and before line 57, please insert the section heading to read
-- Detailed Description of the Preferred Embodiments --

Signed and Sealed this
Twelfth Day of March, 2013

Teresa Stanek Rea
*Acting Director of the United States Patent and Trademark Office*